US009942748B2

(12) United States Patent
Zhu et al.

(10) Patent No.: US 9,942,748 B2
(45) Date of Patent: Apr. 10, 2018

(54) SERVICE PROVISIONING SYSTEM AND METHOD, AND MOBILE EDGE APPLICATION SERVER AND SUPPORT NODE

(71) Applicant: Huawei Technologies Co., Ltd., Shenzhen, Guangdong (CN)

(72) Inventors: Zhiming Zhu, Shenzhen (CN); Weihua Liu, Beijing (CN); Mingrong Cao, Bonn (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 14/832,153

(22) Filed: Aug. 21, 2015

(65) Prior Publication Data

US 2015/0365819 A1 Dec. 17, 2015

Related U.S. Application Data

(63) Continuation of application No. PCT/CN2013/071736, filed on Feb. 21, 2013.

(51) Int. Cl.
*H04M 3/00* (2006.01)
*H04W 8/22* (2009.01)
(Continued)

(52) U.S. Cl.
CPC .......... *H04W 8/22* (2013.01); *H04L 67/2842* (2013.01); *H04W 4/18* (2013.01); *H04W 4/003* (2013.01)

(58) Field of Classification Search
CPC ............... H04L 65/1016; H04L 67/306; H04L 65/4084; H04L 65/608; H04L 67/289;
(Continued)

(56) References Cited

U.S. PATENT DOCUMENTS

2002/0040366 A1* 4/2002 Lahr ................. G06F 17/30887
2006/0206340 A1* 9/2006 Silvera ................ G11B 27/105
704/278

(Continued)

FOREIGN PATENT DOCUMENTS

CN 1874543 A 12/2006
CN 1977549 A 6/2007
(Continued)

*Primary Examiner* — Fred Casca

(57) ABSTRACT

Embodiments of the present invention provide a service provisioning system and method, a mobile edge application server and support node. The system includes: at least one mobile edge application server (MEAS) and at least one mobile edge application server support function (MEAS-SF), where the MEAS is deployed at an access network side; and the MEAS-SF is deployed at a core network side, connected to one or more MEAS. In the service provisioning system provided in the embodiment, services that are provided by an SP are deployed in the MEAS. When the MEAS can provide the user equipment with a service requested in a service request, the MEAS directly and locally generates service data corresponding to the service request. Therefore, the user equipment directly obtains required service data from an RAN side, which avoids data congestion between an RAN and a CN and saves network resources.

13 Claims, 11 Drawing Sheets

(51) Int. Cl.
*H04W 4/18* (2009.01)
*H04L 29/08* (2006.01)
*H04W 4/00* (2018.01)

(58) Field of Classification Search
CPC . H04L 12/14; H04L 12/1836; H04L 12/1881; H04L 41/5054; H04L 45/00; H04L 45/16; H04L 45/50; H04L 65/607; H04H 20/59
USPC ....... 455/418, 414.3, 550.1, 414.2, 419, 423
See application file for complete search history.

(56) References Cited

U.S. PATENT DOCUMENTS

| | | |
|---|---|---|
| 2007/0254671 A1 | 11/2007 | Liu |
| 2009/0003831 A1 | 1/2009 | Zheng |
| 2009/0069051 A1* | 3/2009 | Jain ................. G06K 19/07739 455/558 |
| 2009/0131025 A1* | 5/2009 | Sharma ................. G06Q 20/10 455/414.3 |
| 2010/0177680 A1 | 7/2010 | Fischer et al. |
| 2011/0136488 A1 | 6/2011 | Kuvvali et al. |
| 2011/0202634 A1 | 8/2011 | Kovvali et al. |
| 2012/0099482 A1 | 4/2012 | Shook et al. |
| 2012/0179787 A1* | 7/2012 | Walsh ................. H04L 63/0281 709/219 |
| 2013/0007257 A1* | 1/2013 | Ramaraj ............. H04L 63/0263 709/224 |
| 2013/0007849 A1* | 1/2013 | Coulter .................. G06F 21/10 726/4 |
| 2014/0185606 A1 | 7/2014 | Wei |

FOREIGN PATENT DOCUMENTS

| | | |
|---|---|---|
| CN | 1996913 A | 7/2007 |
| CN | 102143440 A | 8/2011 |
| CN | 102202418 A | 9/2011 |
| CN | 102244900 A | 11/2011 |
| CN | 102550006 A | 7/2012 |
| CN | 102594875 A | 7/2012 |
| EP | 2 775 690 A1 | 9/2014 |

* cited by examiner

SERVICE PROVISIONING SYSTEM AND METHOD, AND MOBILE EDGE APPLICATION SERVER AND SUPPORT NODE

CROSS-REFERENCE TO RELATED APPLICATIONS

This application is a continuation of International Application No. PCT/CN2013/071736, filed on Feb. 21, 2013, which is hereby incorporated by reference in its entirety.

TECHNICAL FIELD

Embodiments of the present invention relate to the field of communications technologies, and in particular, to a service provisioning system and method, and a mobile edge application server and support node.

BACKGROUND

With the rapid popularization of smart devices, the development of the mobile Internet, and the development of wireless network technologies such as a High Speed Packet Access (HSPA for short) technology and a Long Term Evolution technology (LTE for short), an air interface transmission capability becomes stronger, and an operator often meets a requirement for a bandwidth between a user equipment and the Internet by expanding or leasing a backhaul, which leads to a waste of network construction costs and usage costs.

In the prior art, services such as content and an application service that are provided by a service provider (SP for short) may be temporarily stored in a server, and the server is deployed in a telecommunications room of a mobile operator, that is, deployed close to a core network (CN for short); and the user equipment (UE for short) obtains the service from the server through a radio access network (RAN for short) and the CN.

In the foregoing technical solution, deployment of the server which temporarily stores the service data at a core network side can reduce the backhaul between the CN and the Internet, but easily causes data congestion between the RAN and the CN and a waste of bandwidth resources.

SUMMARY

Embodiments of the present invention provide a service provisioning system and method, and a mobile edge application server and a support node, which are used for resolving the problem of data congestion between a RAN and a CN in the prior art and saving network resources.

According to a first aspect, an embodiment of the present invention provides a service provisioning system, including:
at least one mobile edge application server MEAS and at least one mobile edge application server support function MEAS-SF, where the MEAS is deployed at an access network side and connected to one or more base stations; the MEAS-SF is deployed at a core network side, connected to one or more MEASs, and connected to a packet data network gateway P-GW;
the MEAS is configured to receive, through a connected base station, a service request sent by a user equipment, and send the service request to the MEAS-SF, where the service request indicates that the user equipment requests a service from a service provider SP; if the MEAS can provide the user equipment with service data requested in the service request, send the service data requested in the service request to the user equipment through the connected base station; and
the MEAS-SF is configured to receive the service request sent by the MEAS, send the service request to the SP through the P-GW, and receive, through the P-GW, the service data requested in the service request and sent by the SP, so that the core network side charges for the service request and the service data requested in the service request.

In a first possible implementation manner of the first aspect, if the MEAS cannot provide the user equipment with the service data requested in the service request, the MEAS is further configured to obtain, from the MEAS-SF, the service data requested in the service request and sent by the SP, and send, to the user equipment through the connected base station, the service data requested in the service request and sent by the SP.

With reference to the first aspect or the first possible implementation manner of the first aspect, in a second possible implementation manner, the service request sent by the MEAS to the MEAS-SF further carries service processing indication information, and the service processing indication information is used for indicating whether the MEAS can provide the user equipment with the service data requested in the service request; and
the MEAS-SF is further configured to: if the MEAS can provide the user equipment with the service data requested in the service request, discard the service data requested in the service request and sent by the SP; otherwise, if the MEAS cannot provide the user equipment with the service data requested in the service request, send, to the MEAS, the service data requested in the service request and sent by SP.

With reference to the first aspect or any possible implementation manner of the first or second possible implementation manner of the first aspect, in a third possible implementation manner, the MEAS is further configured to: before receiving, through the connected base station, the service request sent by the user equipment, receive, through the connected base station, a first link establishment request sent by the user equipment, where the first link establishment request is used for requesting establishment of a connection between the user equipment and the SP; send the first link establishment request to the MEAS-SF, and receive a first link establishment response to the first link establishment request from the SP, where the first link establishment response is sent by the MEAS-SF; and send, to the user equipment through the connected base station, the first link establishment response to the first link establishment request; and
the MEAS-SF is further configured to receive the first link establishment request sent by the MEAS, and send the first link establishment request to the SP through the P-GW; and receive, through the P-GW, the first link establishment response to the first link establishment request from the SP, and send the first response to the MEAS.

With reference to the first aspect or any possible implementation manner of the first or second possible implementation manner of the first aspect, in a fourth possible implementation manner, the MEAS is further configured to: before receiving, through the connected base station, the service request sent by the user equipment, receive, through the connected base station, a second link establishment request sent by the user equipment, where the second link establishment request is used for requesting establishment of a connection between the user equipment and the SP; and send, to the user equipment through the connected base station, a second link establishment response to the second link establishment request, where the service request sent by the MEAS to the MEAS-SF further carries information about a connection between the MEAS and the user equipment; and the MEAS-SF is further configured to receive the service request that is sent by the MEAS and carries the information about the connection between the MEAS and the user equipment, send a third link establishment request to the SP through the P-GW according to the information about the connection, and receive, through the P-GW, a third link establishment response to the third link establishment request from the SP.

With reference to the first aspect or any possible implementation manner of the first, the second, the third or the fourth possible implementation manner of the first aspect, in a fifth possible implementation manner, if the MEAS can provide the user equipment with the service data requested in the service request, the MEAS-SF is further configured to synchronize, with the MEAS, information of the service data requested in the service request; or, the MEAS-SF is further configured to synchronize, with the MEAS, protocol stack information between the user equipment and the SP.

According to a second aspect, an embodiment of the present invention provides a mobile edge application server, deployed at an access network side, connected to one or more base stations, and further connected to a mobile edge application server support function MEAS-SF, where the mobile edge application server includes:

a receiver, configured to receive, through a connected base station, a service request sent by a user equipment, and send the service request to the MEAS-SF, where the service request indicates that the user equipment requests a service from a service provider SP;

a processor, configured to determine whether the MEAS can provide the user equipment with the service data requested in the service request; and a transmitter, configured to: if the processor determines that the MEAS can provide the user equipment with the service data requested in the service request, send, to the user equipment through the connected base station, the service data requested in the service request.

In a first possible implementation manner of the second aspect, the receiver is further configured to:

if the processor determines that the MEAS cannot provide the user equipment with the service data requested in the service request, obtain, from the MEAS-SF, the service data requested in the service request and sent by the SP; and the transmitter is further configured to send, to the user equipment through the connected base station, the service data requested in the service request and sent by the SP.

With reference to the second aspect or the first possible implementation manner of the second aspect, in a second possible implementation manner of the second aspect, the service request sent by the transmitter to the MEAS-SF further carries service processing indication information, and the service processing indication information is used for indicating whether the MEAS can provide the user equipment with the service data requested in the service request.

With reference to the second aspect or any possible implementation manner of the first or second possible implementation manner of the second aspect, in a third possible implementation manner of the second aspect, the receiver is further configured to: before receiving, through the connected base station, the service request sent by the user equipment, receive, through the connected base station, a first link establishment request sent by the user equipment, where the first link establishment request is used for requesting establishment of a connection between the user equipment and the SP;

the transmitter is further configured to send the first link establishment request to the MEAS-SF;

the receiver is further configured to receive a first link establishment response to the first link establishment request from the SP, where the first link establishment response is sent by the MEAS-SF; and the transmitter is further configured to send, to the user equipment through the connected base station, the first link establishment response to the first link establishment request.

With reference to the second aspect or any possible implementation manner of the first or second possible implementation manner of the second aspect, in a fourth possible implementation manner of the second aspect, the receiver is further configured to: before receiving, through the connected base station, the service request sent by the user equipment, receive, through the connected base station, a second link establishment request sent by the base station, where the second link establishment request is used for requesting establishment of a connection between the user equipment and the SP; and the transmitter is further configured to send, to the user equipment through the connected base station, a second link establishment response to the second link establishment request, add information about a connection between the MEAS and the user equipment in the service request and send the information to the MEAS-SF.

According to a third aspect, an embodiment of the present invention provides a mobile edge application server support function MEAS-SF, connected to one or more mobile edge application servers MEASs and connected to a packet data network gateway P-GW, where the mobile edge application server support function includes:

a receiver, configured to receive a service request sent by an MEAS;

a transmitter, configured to send the service request to an SP through the P-GW, where, the receiver is further configured to receive, through the P-GW, service data requested in the service request and sent by the SP, so that a core network side charges for the service request and the service data requested in the service request.

In a first possible implementation manner of the third aspect, the service request received by the receiver further carries service processing indication information, and the service processing indication information is used for indicating whether the MEAS can provide the user equipment with the service data requested in the service request.

With reference to the third aspect and any possible implementation manner of the first possible implementation manner of the third aspect, in a second possible implementation manner of the third aspect, the mobile edge application server support function further includes: a processor, configured to: after the receiver receives, through the P-GW, the service data requested in the service request and sent by the SP, determine whether the MEAS can provide the user equipment with the service data requested in the service request, and if yes, discard the service data requested in the service request and sent by the SP; and, the transmitter is further configured to: if the processor determines that the MEAS cannot provide the user equipment with the service data requested in the service request, send, to the MEAS, the service data requested in the service request and sent by SP.

With reference to the third aspect or any possible implementation manner of the first and the second possible implementation manners of the third aspect, in a third possible implementation manner of the third aspect, the receiver is further configured to receive a first link establishment request sent by the MEAS, where the first link establishment request is used for requesting establishment of a connection between the user equipment and the SP;

the transmitter is further configured to send the first link establishment request to the SP through the P-GW;

the receiver is further configured to receive, through the P-GW, a first link establishment response to the first link establishment request from the SP; and the transmitter is further configured to send the first response to the MEAS.

With reference to the third aspect or any possible implementation manner of the first and the second possible implementation manners of the third aspect, in a fourth possible implementation manner of the third aspect, the service request received by the receiver further carries connection information, and the connection information is used for indicating that a connection is established between the MEAS and the user equipment;

the transmitter is further configured to send a third link establishment request to the SP through the P-GW according to the connection information; and the receiver is further configured to receive, through the P-GW, a third link establishment response to the third link establishment request from the SP.

With reference to the third aspect or any possible implementation manner of the first, the second, the third and the fourth possible implementation manners of the third aspect, in a fifth possible implementation manner of the third aspect, if the processor determines that the MEAS can provide the user equipment with the service data requested in the service request, the processor is further configured to synchronize, with the MEAS, information of the service data requested in the service request; or, the processor is further configured to synchronize, with the MEAS, protocol stack information between the user equipment and the SP.

According to a fourth aspect, an embodiment of the present invention provides a service provisioning method, including:

receiving, by a mobile edge application server MEAS through a connected base station, a service request sent by a user equipment, and sending the service request to a mobile edge application server support function MEAS-SF, where the service request indicates that the user equipment requests a service from a service provider SP, and the MEAS is deployed at an access network side, connected to one or more base stations, and connected to the mobile edge application server support function MEAS-SF; and if the MEAS can provide the user equipment with a service requested in the service request, sending, through the connected base station, service data requested in the service request to the user equipment.

In a first possible implementation manner of the fourth aspect, if the MEAS cannot provide the user equipment with the service data requested in the service request, the MEAS is further configured to obtain, from the MEAS-SF, the service data requested in the service request and sent by the SP, and send, to the user equipment through the connected base station, the service data requested in the service request and sent by the SP.

With reference to the fourth aspect or any possible implementation manner of the first possible implementation manner of the fourth aspect, in a second possible implementation manner of the fourth aspect, the service request sent by the MEAS to the MEAS-SF further carries service processing indication information, and the service processing indication information is used for indicating whether the MEAS can provide the user equipment with the service data requested in the service request.

With reference to the fourth aspect or any possible implementation manner of the first or second possible implementation manner of the fourth aspect, in a third possible implementation manner of the fourth aspect, before the receiving, by a mobile edge application server MEAS through a connected base station, a service request sent by a user equipment, the method further includes:

receiving, by the MEAS through the connected base station, a first link establishment request sent by the user equipment, where the first link establishment request is used for requesting establishment of a connection between the user equipment and the SP;

sending, by the MEAS, the first link establishment request to the MEAS-SF, so that the MEAS-SF sends the first link establishment request to the SP;

receiving, by the MEAS, a first link establishment response to the first link establishment request from the SP, where the first link establishment response is sent by the MEAS-SF; and sending, by the MEAS to the user equipment through the connected base station, the first link establishment response to the first link establishment request.

With reference to the fourth aspect or any implementation manner of the first possible implementation manner of the fourth aspect, in a fourth possible implementation manner of the fourth aspect, before the receiving, by a mobile edge application server MEAS through a connected base station, a service request sent by a user equipment, the method further includes:

receiving, by the MEAS through the connected base station, a second link establishment request sent by the user equipment, where the second link establishment request is used for requesting establishment of a connection between the user equipment and the SP; and sending, by the MEAS to the user equipment through the connected base station, a second link establishment response to the second link establishment request; and, the receiving, by a mobile edge application server MEAS through a connected base station, a service request sent by a user equipment, and sending the service request to a mobile edge application server support function MEAS-SF includes:

sending, by the MEAS, the service request carrying information about a connection between the MEAS and the user equipment to the MEAS-SF.

According to a fifth aspect, an embodiment of the present invention provides a service provisioning method, including:

receiving, by a mobile edge application server support function MEAS-SF, a service request sent by a mobile edge application server MEAS, where the MEAS-SF is deployed at a core network side, connected to one or more mobile edge application servers MEASs, and connected to a packet data network gateway P-GW;

sending, by the MEAS-SF, the service request to a service provider SP; and receiving, by the MEAS-SF through the P-GW, service data requested in the service request and sent by the SP, so that the core network side charges for the service request and the service data requested in the service request.

In a first possible implementation manner of the fifth aspect, the service request sent by the MEAS and received by the MEAS-SF further carries service processing indication information, and the service processing indication information is used for indicating whether the MEAS can provide the user equipment with the service data requested in the service request.

With reference to the fifth aspect or any possible implementation manner of the first possible implementation manner of the fifth aspect, in a second possible implementation manner of the fifth aspect, after the receiving, by the MEAS-SF through the P-GW, service data requested in the service request and sent by the SP, the method further includes:

determining, by the MEAS-SF, whether the MEAS can provide the user equipment with the service data requested in the service request, if yes, discarding the service data requested in the service request and sent by the SP; and if not, sending, to the MEAS, the service data requested in the service request and sent by the SP.

With reference to the fifth aspect or any possible implementation manner of the first and the second possible implementation manners of the fifth aspect, in a third possible implementation manner of the fifth aspect, before the receiving, by a mobile edge application server support function MEAS-SF, a service request sent by a mobile edge application server MEAS, the method further includes:

receiving, by the MEAS-SF, a first link establishment request sent by the MEAS;

sending, by the MEAS-SF, the first link establishment request to the SP through the P-GW;

receiving, by the MEAS-SF through the P-GW, a first link establishment response to the first link establishment request from the SP; and sending, by the MEAS-SF to the MEAS, the first link establishment response to the first link establishment request from the SP.

With reference to the fifth aspect or any possible implementation manner of the first or second possible implementation manner of the fifth aspect, in a fourth possible implementation manner of the fifth aspect, the receiving, by a mobile edge application server support function MEAS-SF, a service request sent by a mobile edge application server MEAS includes:

receiving, by the MEAS-SF, a service request which carries connection information and is sent by the MEAS, where the connection information is used for indicating that a connection is established between the MEAS and the user equipment;

sending a third link establishment request to the SP through the P-GW according to the connection information; and receiving, through the P-GW, a third link establishment response to the third link establishment request from the SP.

With reference to the fifth aspect or any possible implementation manner of the first, the second, the third and the fourth possible implementation manners of the fifth aspect, in a fifth possible implementation manner of the fifth aspect, the method further includes: if the MEAS can provide the user equipment with the service data requested in the service request, synchronizing, by the MEAS-SF, information of the service data requested in the service request with the MEAS; or synchronizing, with the MEAS, protocol stack information between the user equipment and the SP.

The embodiments of the present invention provide a service provisioning system and method, and a mobile edge application server and support node, where the MEAS receives a service request that is sent by a base station and the service request indicates that a user equipment requests a service from an SP, and sends the service request to the MEAS-SF; the MEAS-SF further sends the service request to the SP; the MEAS sends, to the base station, service data that is locally generated or received from the SP in response to the service request, where the service data carries the service requested in the service request; then, the base station sends the service data to the user equipment, so as to provide the service for the user equipment. According to the service provisioning method provided in the embodiment, services such as content and an application service that are provided by the SP are deployed in the MEAS, and when the MEAS can provide the user equipment with the service requested in the service request, the MEAS directly and locally generates service data in response to the service request; because the MEAS is generally close to an eNodeB in physical deployment, that is, deployed at a RAN side, the user equipment directly obtains required service data from the RAN side instead of obtaining, from a server or the Internet through a RAN or a CN, the service data provided by the SP, which avoids data congestion between the RAN and the CN and saves network resources.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

Figure 1:
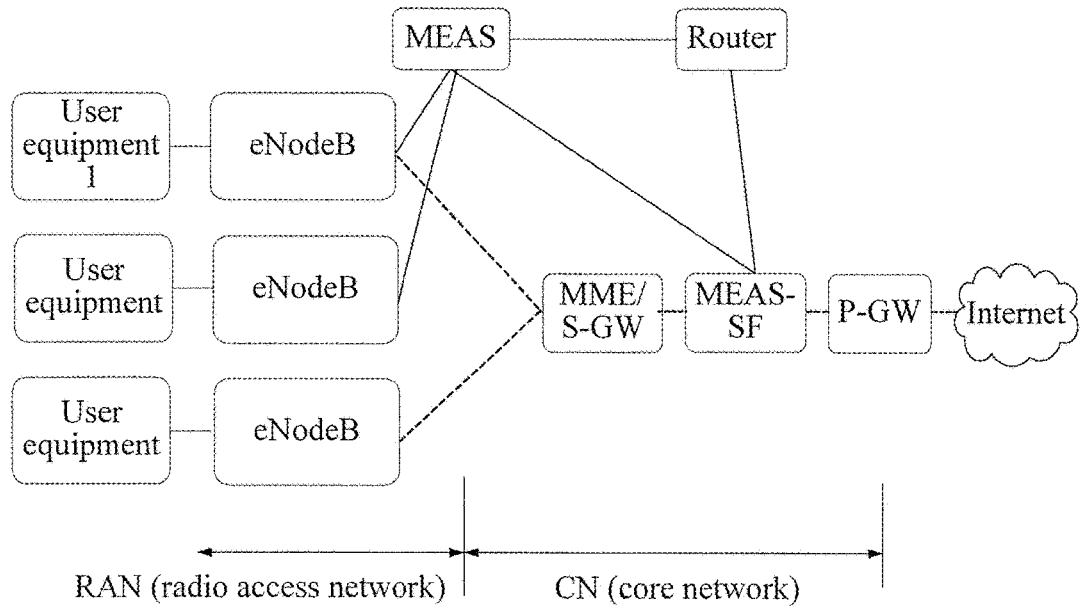
FIG. 1 is a schematic architectural diagram of a service provisioning system according to one embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

The technology described in the present invention may be used in various communications systems, such as current 2G and 3G communications systems and a next generation communications system, such as a Global System for Mobile Communications (GSM for short), a Code Division Multiple Access (CDMA for short) system, a Time Division Multiple Access (TDMA for short) system, a Wideband Code Division Multiple Access Wireless (WCDMA for short), a Frequency Division Multiple Addressing (FDMA for short) system, an Orthogonal Frequency-Division Multiple Access (OFDMA for short) system, a single carrier FDMA (SC-FDMA) system, a General Packet Radio Service (GPRS for short) system, a Long Term Evolution (LTE for short) system, and the like.

A user equipment involved in the present application may be a wireless terminal, and may also be a wired terminal, where the wireless terminal may refer to a device providing voice and/or data connectivity for a user, a handheld device having a wireless connection function, or another processing device connected to a wireless modem. The wireless terminal may communicate with one or more core networks through a radio access network (RAN), and the wireless terminal may be a mobile terminal, such as a mobile phone (or called a "cellular" phone) and a computer having a mobile terminal, for example, the wireless terminal may be a portable, pocket-sized, handheld, computer-embedded, or vehicle-mounted mobile apparatus, which exchanges languages and/or data with the radio access network. For example, the wireless terminal is a personal communication service (PCS for short) phone, a cordless phone, a session initiation protocol (SIP) phone, a wireless local loop (WLL for short) station, a personal digital assistant (PDA for short), and the like. The wireless terminal may also be called a system, a subscriber unit, a subscriber station, a mobile station, a remote station, an access point, a remote terminal, an access terminal, a user terminal, a user agent, a user device, or a user equipment.

A base station (for example, an access point) involved in the present application may refer to a device that communicates with a wireless terminal through one or more sectors over an air interface in an access network. The base station may be configured to perform conversion between a received air frame and an IP packet, and serve as a router between the wireless terminal and rest parts of the access network, where the rest parts of the access network may include an Internet protocol (IP) network. The base station may further coordinate attribute management on the air interface. For example, the base station may be a base station (BTS, Base Transceiver Station) in a GSM or CDMA network, or may also be a base station (NodeB) in a WCDMA network, or may further be an evolved base station (NodeB or eNB or e-NodeB, evolved Node B) in a LTE network, which is not limited in this application.

A service provisioning method is described in the embodiments of the present invention by using a Long Term Evolution (LTE for short) communications system as an example, but the service provisioning method provided in the embodiments of the present invention is still applicable to other communications systems.

FIG. 1 is a schematic architectural diagram of Embodiment 1 of a service provisioning system according to the present invention, and this embodiment is applicable to a scenario in which multiple eNodeBs correspond to one mobile edge application server (MEAS for short) and one mobile edge application server support function (MEAS-SF for short). As shown in FIG. 1, the service provisioning system provided in this embodiment includes: at least one MEAS and one MEAS-SF, where the MEAS is deployed at an access network side and connected to one or more base stations; and the MEAS-SF is deployed at a core network side, connected to one or more MEASs, and connected to a packet data network gateway P-GW.

The MEAS is configured to receive, through a connected base station, a service request sent by a user equipment, and send the service request to the MEAS-SF, where the service request indicates that the user equipment requests a service from a service provider SP; and if the MEAS can provide the user equipment with service data requested in the service request, send, to the user equipment through the connected base station, the service data requested in the service request.

The MEAS-SF is configured to receive the service request sent by the MEAS, send the service request to the SP through the P-GW, and receive, through the P-GW, the service data requested in the service request and sent by the SP, so that the core network side charges for the service request and the service data requested in the service request.

Referring to FIG. 1, based on a network architecture of the LTE communications system, the MEAS and the MEAS-SF are added in the embodiment of the present invention. The MEAS is deployed close to the base station (eNodeB) at the access network side and bears services such as content and an application service that are provided by the SP; the MEAS-SF may be deployed at the core network side, and disposed between the packet data network gateway (P-GW for short) and a serving gateway (S-GW for short); a General Packet Radio Service (GPRS for short) Tunneling Protocol for user plane (GTPU for short) proxy is deployed in the MEAS-SF, and protocol layers from top to bottom include: a transmission layer protocol/user datagram protocol (Transmission Control Protocol/User Datagram Protocol, TCP/UDP for short), an Internet protocol IP for short below), a GTPU, a UDP, an IP, and the like. The MEAS and the MEAS-SF may be connected in networking, for example, may be connected directly or connected through a router (two connection situations are shown in FIG. 1, and in a practical application, one of the two connection situations may be selected to connect the MEAS and the MEAS-SF). Dashed lines in the figure show existing network communication paths between user equipments and the Internet, which are briefly referred to as a conventional network for uniform descriptions; and solid lines show network communication paths between the user equipments and the Internet in the present invention, which are briefly referred to as an MEAS network for uniform descriptions. In the embodiment of the present invention, multiple eNodeBs correspond to one MEAS and one MEAS-SF.

The user equipment sends the service request to the eNodeB, and if the eNodeB is connected to the MEAS, the eNodeB may send the service request to the MEAS by using the MEAS network. The service request indicates that the user equipment requests a service from the SP, including content, an application service, and the like, for example, requesting a browse of a video, a picture, or the like, or, requesting access to an application service such as a mailbox, a bank account, or the like. The MEAS determines, according to services such as content and an application service deployed in the MEAS, whether the MEAS can provide the user equipment with the service data requested in the service request and send the service request to the MEAS-SF; and if the MEAS can provide the user equipment with the service data requested in the service request, the MEAS sends, to the user equipment through the eNodeB, the service data requested in the service request. The MEAS-SF sends the received service request to the SP through the connected P-GW, and receives, through the P-GW, the service data requested in the service request and sent by the SP; functional module such as a CC, an LIG, and a PCRF is connected to or integrated in the P-GW, that is, the P-GW is connected to the CC, the LIG, and the PCRF. Therefore, the P-GW can perform related operations such as charging, interception, and policy control on the user equipment in an uplink process after receiving the foregoing service request, and in a downlink process after receiving the service data which is generated by the SP in response to the service request, that is, the core network side charges for the service request and the service data requested in the service request.

If the MEAS determines, according to borne services such as content and an application service, that the MEAS cannot provide the user equipment with the service data requested in the service request, the MEAS is further configured to obtain, from the MEAS-SF, the service data requested in the service request and sent by the SP, and send the service data to the user equipment through the connected base station.

Specifically, the service request sent by the MEAS to the MEAS-SF further carries service processing indication information, and the service processing indication information is used for indicating whether the MEAS can provide the user equipment with the service data requested in the service request. After receiving the service request that is sent by the MEAS and carries the service processing indication information, the MEAS-SF obtains the service processing indication information by means of parsing, and determines, according to the service processing indication information, whether the MEAS can provide the user equipment with the service data requested in the service request; if the service processing indication information indicates that the MEAS can provide the user equipment with the service data requested in the service request, the MEAS-SF discards the received service data that is generated by the SP in response to the service request and sent by the SP, and initiates a protocol stack information synchronization task, to ensure that the service data sent by the SP can be directly received after eNodeB handover; otherwise, if the service processing indication information indicates that the MEAS cannot provide the user equipment with the service data requested in the service request, for example, when the service data requested in the service request is not deployed in the MEAS, the MEAS-SF sends, to the MEAS, the received service data that is generated by the SP in response to the service request.

In the foregoing Embodiment 1, before receiving, through the connected base station, the service request sent by the user equipment, the MEAS further receives, through the connected base station, a first link establishment request sent by the user equipment, where the first link establishment request is used for requesting establishment of a connection between the user equipment and the SP; sends the first link establishment request to the MEAS-SF, and receives a first link establishment response to the first link establishment request from the SP, where the first link establishment response is sent by the MEAS-SF; and sends, to the user equipment through the connected base station, the first link establishment response to the first link establishment request; and the MEAS-SF is further configured to receive the first link establishment request sent by the MEAS, and send the first link establishment request to the SP through the P-GW; and receive, through the P-GW, the first link establishment response to the first link establishment request from the SP, and send the first response to the MEAS.

Referring to FIG. 1, a user equipment 1 is used as an example; the user equipment 1 sends the first link establishment request such as a SYN (synchronize) packet for link establishment to the eNodeB; after receiving the SYN packet, the eNodeB may send the SYN packet to the SP through the conventional network or through the MEAS network provided in the embodiment of the present invention; if the SYN packet is sent to the SP through the conventional network, subsequent procedures and processing are the same as those in the existing conventional network, and transparent service transmission is implemented at the MEAS-SF; for details, refer to the prior art, which is not described herein again. If the SYN packet is sent to the SP through the MEAS network, the MEAS receives the SYN packet sent by the eNodeB, records information about direct or indirect interaction between the MEAS and each network element and information exchanged in a link establishment process, and sends the SYN packet to the MEAS-SF; the MEAS sends the SYN packet to the SP through the conventional network via the MEAS-SF and the P-GW. Then, the SP returns a link establishment response to the user equipment 1, that is, the SP sends an SYN ACK to the MEAS through the MEAS-SF, so that the eNodeB sends the SYN ACK to the user equipment 1, thereby establishing a protocol stack. In this process, the MEAS records protocol stack information, such as a synchronization number and a serial number, sent from the SP to the user equipment, which is specifically a link establishment response such as the SYN ACK to the first link establishment request, where the link establishment response is sent by the SP to the user equipment through the P-GW, the MEAS-SF, the MEAS, the S-GW, and the eNodeB. Then, the user equipment returns an ACK to the SP, and the MEAS records protocol stack information sent from the user equipment to the SP, where the protocol stack information is specifically a link establishment response such as the ACK to the first link establishment request, where the link establishment response is sent from the user equipment to the SP through the eNodeB, the MEAS, the S-GW, the MEAS-SF, the P-GW. Similarly, the MEAS-SF also needs to record information of protocol stack interaction. When a user initiates the service request, if transmission layer protocol processing is deployed in both the MEAS and the MEAS-SF, the MEAS perceives the content or the application service, and needs to perform synchronization on protocol stack states and data migration for each service request; if in the MEAS, the transmission layer protocol processing is not deployed, and only application layer data is deployed, the MEAS perceives the content or the application service, the MEAS and the MEAS-SF perform transmission by using data length and offset information so as to save a backhaul bandwidth, and the MEAS responds, according to mirror images such as the received data length and offset, to the service requested in the service request.

Figure 2:
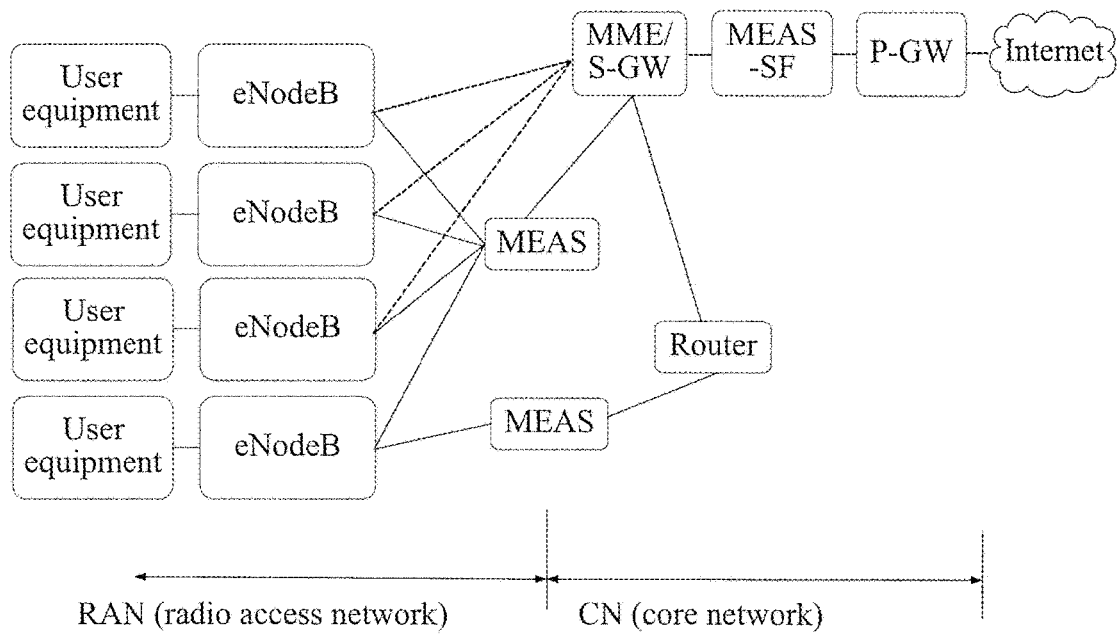
FIG. 2 is a schematic architectural diagram of a service provisioning system according to one embodiment of the present invention.

FIG. 2 is a schematic architectural diagram of Embodiment 2 of a service provisioning system according to the present invention. This embodiment is applicable to a scenario in which an eNodeB may correspond to one MEAS or MEAS-SF. An implementation manner of this embodiment is similar to the implementation manner of Embodiment 1; for a specific principle, refer to FIG. 1, which is not described herein again. In addition, in this embodiment, before receiving, through a connected base station, a service request sent by a user equipment, the MEAS further receives, through the connected base station, a second link establishment request sent by the user equipment, where the second link establishment request is used for requesting establishment of a connection between the user equipment and the SP, and sends, to the user equipment through the connected base station, a second link establishment response to the second link establishment request, where the service request sent by the MEAS to the MEAS-SF further carries information about a connection between the MEAS and the user equipment; and The MEAS-SF is further configured to receive the service request that is sent by the MEAS and carries the information about a connection between the MEAS and the user equipment, send a third link establishment request to the SP through the P-GW according to the connection information, and receive, through the P-GW, a third link establishment response to the third link establishment request from the SP.

Referring to FIG. 2, a user equipment 2 is used as an example; the user equipment 2 sends the second link establishment request to an eNodeB, and after receiving an SYN packet, the eNodeB uses a conventional network or an MEAS network according to a flow control principle; if the conventional network is used, subsequent procedures and processing are the same as those in the existing conventional network, and transparent service transmission is implemented at the MEAS-SF; for details, refer to the prior art, which is not described herein again. If the MEAS network is used, the MEAS receives the SYN packet sent by the eNodeB, and establishes, in instead of the SP, a connection to the user equipment 2. Then, the MEAS sends an SYN ACK to the user equipment 2 through the eNodeB, and the user equipment returns, to the MEAS through the eNodeB, the second link establishment response such as an ACK to the second link establishment request. That is, the connection between the user equipment and the MEAS is established by means of a three-way handshake. When the user equipment 2 initiates a service request, the MEAS adds, in the service request, connection information indicating that the connection is established between the user equipment and the MEAS, and sends the connection information to the MEAS-SF; and after the MEAS-SF obtains, by means of parsing, link establishment information indicating that only the connection between the user equipment and the MEAS is established, the MEAS-SF sends a third link establishment request to the SP through the P-GW according to the connection information, and receives, through the P-GW, a third link establishment response to the third link establishment request from the SP, so as to establish a connection between the MEAS-SF and the SP.

It should be noted that, in the foregoing Embodiment 1, the user equipment sends the first link establishment request, so that the user equipment directly establishes a connection to the SP; in Embodiment 2, the user equipment is indirectly connected to the SP, that is, the user equipment first establishes a connection to the MEAS, and then sends, to the MEAS-SF, the service request carrying the connection information indicating that the connection is established between the user equipment and the MEAS; the MEAS-SF establishes a connection to the SP after obtaining the connection information by means of parsing, thereby establishing the connection between the user equipment and the SP. However, the present invention is not limited thereto; in other possible implementation manners, the user equipment in Embodiment 1 may also indirectly connect to the SP; and the user equipment in Embodiment 2 may also directly connect to the SP.

Figure 3:
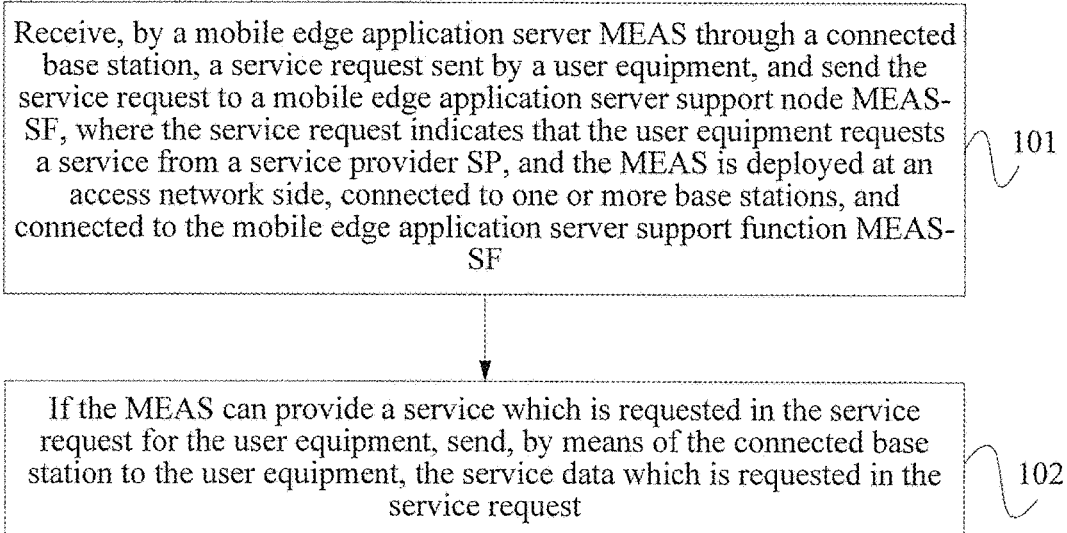
FIG. 3 is a flowchart of a service provisioning method according to one embodiment of the present invention.

FIG. 3 is a flowchart of Embodiment 1 of a service provisioning method according to the present invention. Referring to FIG. 1, this embodiment is executed by an MEAS, and this embodiment is described by using a scenario in which multiple eNodeBs correspond to one MEAS and one MEAS-SF as an example. Specifically, this embodiment may include the following steps:

101: The mobile edge application server MEAS receives, through a connected base station, a service request sent by a user equipment, and sends the service request to the mobile edge application server support function MEAS-SF, where the service request indicates that the user equipment requests a service from a service provider SP, and the MEAS is deployed at an access network side, connected to one or more base stations, and connected to the mobile edge application server support function MEAS-SF.

Specifically, the user equipment may send the service request to the eNodeB, and the eNodeB may send the service request to the MEAS, where the service request indicates that the user equipment requests a service from the SP. The service requested includes content and an application service, for example, requesting a browse of a video, a picture, or the like, or, requesting access to an application service such as a mailbox, a bank account, or the like.

The MEAS sends the received service request to the MEAS-SF, so that the MEAS-SF sends the service request to the SP. In this process, because the MEAS-SF is connected to a P-GW, the MEAS-SF can send the service request to the SP through the P-GW. Moreover, because the P-GW is connected to a charging center (CC for short), a lawful interception gateway (LIG for short), and a Policy And Charging Rules Function (PCRF for short), the P-GW may perform related operations such as charging, interception, and policy control on the user equipment after receiving the foregoing service request.

102: If the MEAS can provide the user equipment with a service requested in the service request, the MEAS sends, to the user equipment through the connected base station, the service data requested in the service request.

In this step, because services such as content and an application service that are provided by the SP are deployed in the MEAS, the MEAS can determine whether the service data requested in the service request can be provided locally for the user equipment, and if yes, the MEAS sends, to the user equipment according to the received service request, the service data requested in the service request; if the MEAS cannot provide the user equipment with the service data requested in the service request, the MEAS may wait for the service data, which is generated by the SP in response to the service request, sent by the MEAS-SF. Specifically, the service request initiated by the user equipment is sent to the MEAS through the eNodeB, and the MEAS receives the service request and determines whether the MEAS can provide the user equipment with the service data requested in the service request, and sends the service request to the MEAS-SF; then, the MEAS-SF sends the service request to the SP, and the SP generates the service data requested in the service request and sends the service data to the MEAS-SF. When determining that the MEAS can process the service request, the MEAS-SF discards the service data requested in the service request and sent by the SP; otherwise, if determining that the MEAS cannot provide the user equipment with the service data requested in the service request, the MEAS-SF sends, to the MEAS, the service data requested in the service request and sent by the SP, so that the MEAS further sends the service data to the user equipment, so as to provide the service for the user equipment. The service data carries the service requested in the service request, for example, allowing the user equipment to browse a video, a picture, or the like, or providing an application service such as access to a mailbox, a bank account, or the like for the user equipment.

According to the service provisioning method provided in this embodiment, the MEAS receives, through the connected base station, the service request indicating that the user equipment requests the service from the SP, and sends the service request to the MEAS-SF; the MEAS-SF further sends the service request to the SP; the MEAS sends, to the user equipment through the base station, the service data requested in the service request and generated locally or received from the SP, thereby providing the service for the user equipment. According to the service provisioning method provided in this embodiment, services such as content and an application service that are provided by the SP are deployed in the MEAS, and when the MEAS can provide the user equipment with the service requested in the service request, the MEAS directly and locally generates, in response to the service request, service data requested in the service request and provides the service for the user equipment; because the MEAS is generally close to the eNodeB in physical deployment, that is, deployed at a RAN side, the user equipment directly obtains a required service from the RAN side instead of obtaining, from a server or the Internet through a RAN and a CN, the service provided by the SP, which avoids data congestion between the RAN and the CN and saves network resources.

Based on the foregoing Embodiment 1, optionally, the service request sent by the MEAS to the MEAS-SF further carries service processing indication information, and the service processing indication information is used for indicating whether the MEAS can provide the user equipment with the service data requested in the service request.

Specifically, after receiving the service request that is initiated by the user equipment and transparently transmitted through the eNodeB, the MEAS determines, according to the deployed services such as content and an application service that are provided by the SP, whether the MEAS can process the service request, that is, whether the MEAS can generate service data in response to the service request. If the MEAS can provide the user equipment with the service data requested in the service request, the service processing indication information indicating that the MEAS can provide the user equipment with the service data requested in the service request is set in the service request; otherwise, if the MEAS cannot provide the user equipment with the service data requested in the service request, the service processing indication information indicating that the MEAS cannot process the service request is set in the service request, and the service processing indication information is carried in the service request and sent to the MEAS-SF.

Based on the foregoing embodiment, as a possible implementation manner, before receiving, through the connected base station, the service request sent by the user equipment, the MEAS further receives, through the connected base station, a first link establishment request sent by the user equipment, where the first link establishment request is used for requesting establishment of a connection between the user equipment and the SP; and sends the first link establishment request to the MEAS-SF, so that the MEAS-SF sends the first link establishment request to the SP. The MEAS receives a first link establishment response to the first link establishment request from the SP, where the first link establishment response is sent by the MEAS-SF; and the MEAS sends, to the user equipment through the connected base station, the first link establishment response to the first link establishment request.

For detailed information, refer to the process in which the user equipment directly establishes the connection to the SP by sending the first link establishment request in the embodiment in FIG. 1, which is not described herein again.

Based on the foregoing embodiment, as another possible implementation manner, before receiving, through the connected base station, the service request sent by the user equipment, the MEAS further receives, through the connected base station, a second link establishment request sent by the user equipment, where the second link establishment request is used for requesting establishment of the connection between the user equipment and the SP; the MEAS sends, to the user equipment through the connected base station, a second link establishment response to the second link establishment request.

The MEAS receiving, through the connected base station, the service request sent by the user equipment, and sending the service request to the MEAS-SF includes:

sending, by the MEAS, the service request carrying information about a connection between the MEAS and the user equipment to the MEAS-SF.

For details, refer to a process in which the user equipment indirectly establishes the connection to the SP by sending the second link establishment request in the embodiment in FIG. 2, which is not described herein again.

Figure 4:
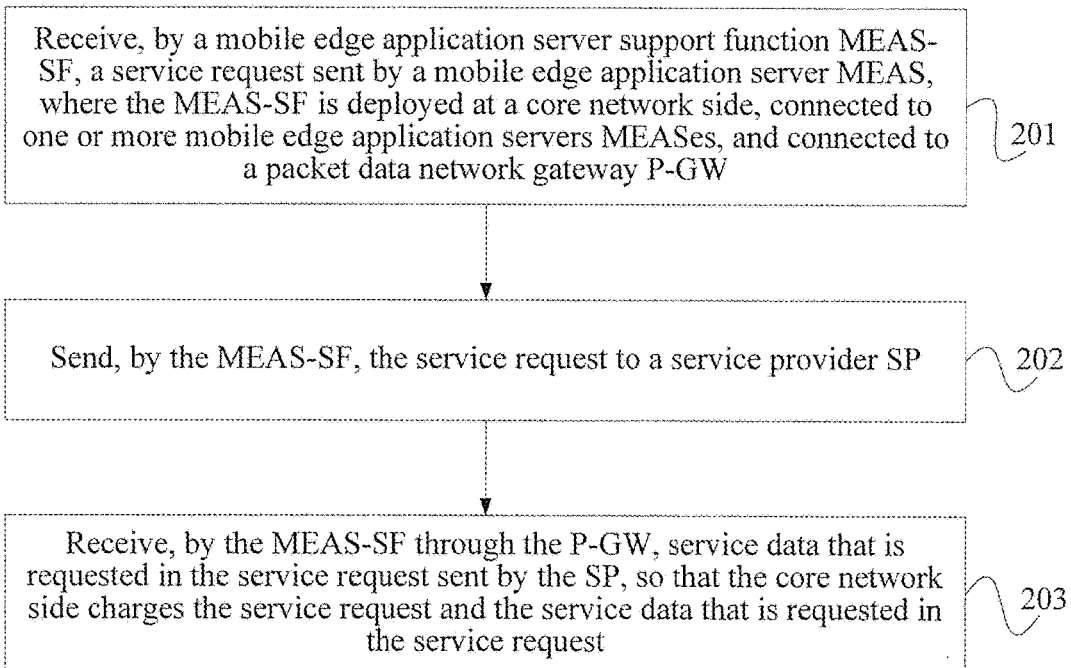
FIG. 4 is a flowchart of a service provisioning method according to one embodiment of the present invention.

FIG. 4 is a flowchart of Embodiment 2 of a service provisioning method according to the present invention. Based on the foregoing communications network shown in FIG. 1, this embodiment is executed by an MEAS-SF, and this embodiment is applicable to a scenario in which multiple eNodeBs are corresponding to one MEAS and MEAS-SF in the communications network; specifically, this embodiment may include the following steps.

201: The mobile edge application server support function MEAS-SF receives a service request sent by the mobile edge application server MEAS, where the MEAS-SF is deployed at a core network side, connected to one or more mobile edge application servers MEASs, and connected to a packet data network gateway P-GW.

Specifically, after passing through an eNodeB, the service request initiated by the user equipment is sent by the eNodeB to the MEAS, the MEAS further sends the service request to the MEAS-SF, and the MEAS-SF receives the service request. The service requested includes content and an application service, for example, requesting a browse of a video, a picture, or the like, or, requesting access to an application service such as a mailbox, a bank account, or the like.

202: The MEAS-SF sends the service request to a service provider SP.

The MEAS-SF sends the received service request to the SP through the P-GW. Functional module such as a CC, an LIG, and a PCRF is connected to or integrated in the P-GW, that is, the P-GW is connected to the CC, the LIG, and the PCRF. Therefore, the P-GW may perform related operations such as charging, interception, and policy control on the user equipment in an uplink process after receiving the foregoing service request.

203: The MEAS-SF receives, through the P-GW, service data requested in the service request and sent by the SP, so that the core network side charges for the service request and the service data requested in the service request.

Specifically, all service requests initiated by the user equipment are sent to the MEAS via the eNodeB; the MEAS sends all the received service requests to the MEAS-SF, and the MEAS-SF sends all the received service requests to the SP through the P-GW, so that the SP generates, in response to all the received service requests, service data requested in the service requests, and sends the service data to the MEAS-SF through the P-GW, so as to complete operations such as charging for the service data requested in the service request at the core network side in a downlink process.

According to the service provisioning method provided in this embodiment, the MEAS-SF receives the service request sent by the MEAS and sends the service request to the SP; the SP generates service data in response to all the received service requests, and sends the service data to the MEAS-SF through the P-GW; and the MEAS-SF determines, according to a capability of the MEAS for providing the service requested in the service request, whether to send, to the MEAS, the service data requested in the service request and sent by the SP. According to the service provisioning method provided in this embodiment, services such as content and an application service that are provided by the SP are deployed in the MEAS, and when the MEAS-SF determines that the MEAS can provide the user equipment with the service data requested in the service request, the MEAS-SF discards the service data which is generated by the SP in response to the service request, and the MEAS directly and locally generates service data in response to the service request; because the MEAS may be generally close to the eNodeB in physical deployment, that is, deployed at a RAN side, the user equipment directly obtains required service data from the RAN side instead of obtaining, from a server or the Internet through a RAN and a CN, the service provided by the SP, which avoids data congestion between the RAN and the CN and saves network resources.

Based on the foregoing Embodiment 2, the service request sent by the MEAS and received by the MEAS-SF further carries service processing indication information, and the service processing indication information is used for indicating whether the MEAS can provide the user equipment with the service data requested in the service request.

Specifically, after receiving the service request that is initiated by the user equipment and flows to the MEAS via the eNodeB, the MEAS determines, according to the deployed services such as content and an application service that are provided by the SP, whether the MEAS can process the service request, that is, whether the MEAS can generate corresponding service data in response to the service request. If the MEAS can provide the user equipment with the service data requested in the service request, the service processing indication information indicating that the MEAS can provide the user equipment with the service data requested in the service request is set in the service request; otherwise, if the MEAS cannot provide the user equipment with the service data requested in the service request, the service processing indication information indicating that the MEAS cannot process the service request is set in the service request, and the service processing indication information is carried in the service request and sent to the MEAS-SF. After receiving the service request carrying the service processing indication information, the MEAS-SF parses the service request, and records, according to the service processing indication information obtained by means of parsing, whether the MEAS can provide the user equipment with the service requested in the service request, that is, records a capability of the MEAS for providing the service requested in the service request. Then, the MEAS-SF deletes the service processing indication information, and sends the service request to the SP.

Further, after the MEAS-SF receives, through the P-GW, the service data requested in the service request and sent by the SP, the MEAS-SF determines whether the MEAS can provide the user equipment with the service data requested in the service request, and if yes, discards the service data requested in the service request and sent by the SP; and if not, sends, to the MEAS, the service data requested in the service request and sent by the SP.

Specifically, after the MEAS-SF receives, through the P-GW, the service data requested in the service request and sent by the SP, the MEAS-SF determines, according to the service processing indication information obtained by means of parsing, that is, the capability of the MEAS for providing the service requested in the service request, whether to send, to the MEAS, the service data requested in the service request and sent by the SP. If the capability of the MEAS recorded by the MEAS-SF indicates that the MEAS can provide the user equipment with the service data requested in the service request, the MEAS-SF discards the service data requested in the service request and sent by the SP; otherwise, if the capability of the MEAS recorded by the MEAS-SF indicates that the MEAS cannot provide the user equipment with the service data requested in the service request, the MEAS-SF sends, to the MEAS, the service data requested in the service request and sent by the SP, and the MEAS further sends the service data to the user equipment through the eNodeB, so as to provide the service for the user equipment.

Based on the foregoing embodiment, as a possible implementation manner, before the receiving, by the mobile edge application server support function MEAS-SF, a service request sent by the mobile edge application server MEAS, the method further includes: receiving, by the MEAS-SF, a first link establishment request sent by the MEAS, sending the first link establishment request to the SP through the P-GW, and receiving, through the P-GW, a first link establishment response to the first link establishment request from the SP; and sending, to the MEAS, the first link establishment response to the first link establishment request from the SP.

For detailed information, refer to the process in which the user equipment directly establishes the connection to the SP by sending the first link establishment request in the embodiment in FIG. 1, which is not described herein again.

Based on the foregoing embodiment, as another possible implementation manner, the receiving, by the mobile edge application server support function MEAS-SF, a service request sent by the mobile edge application server MEAS includes: receiving, by the MEAS-SF, the service request that is sent by the MEAS and carries connection information, where the connection information is used for indicating that a connection is established between the MEAS and the user equipment; and sending a third link establishment request to the SP through the P-GW according to the connection information, and receiving, through the P-GW, a third link establishment response to the third link establishment request from the SP.

For detailed information, refer to the process in which the user equipment indirectly establishes the connection to the SP by sending the second link establishment request in the embodiment in FIG. 2, which is not described herein again.

Figure 5A:
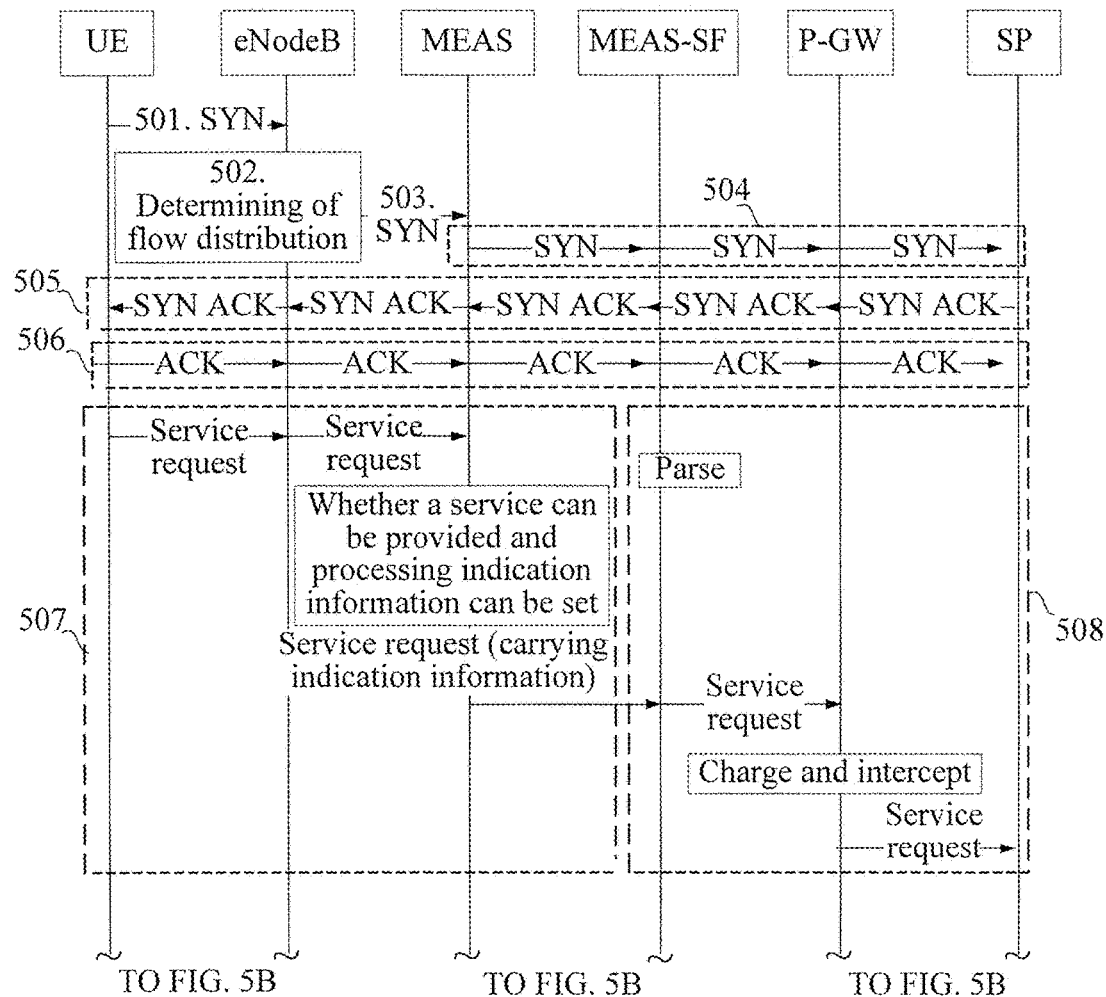
FIG. 5A and FIG. 5B are a signaling diagram of a service provisioning method according to one embodiment of the present invention.
Figure 5B:
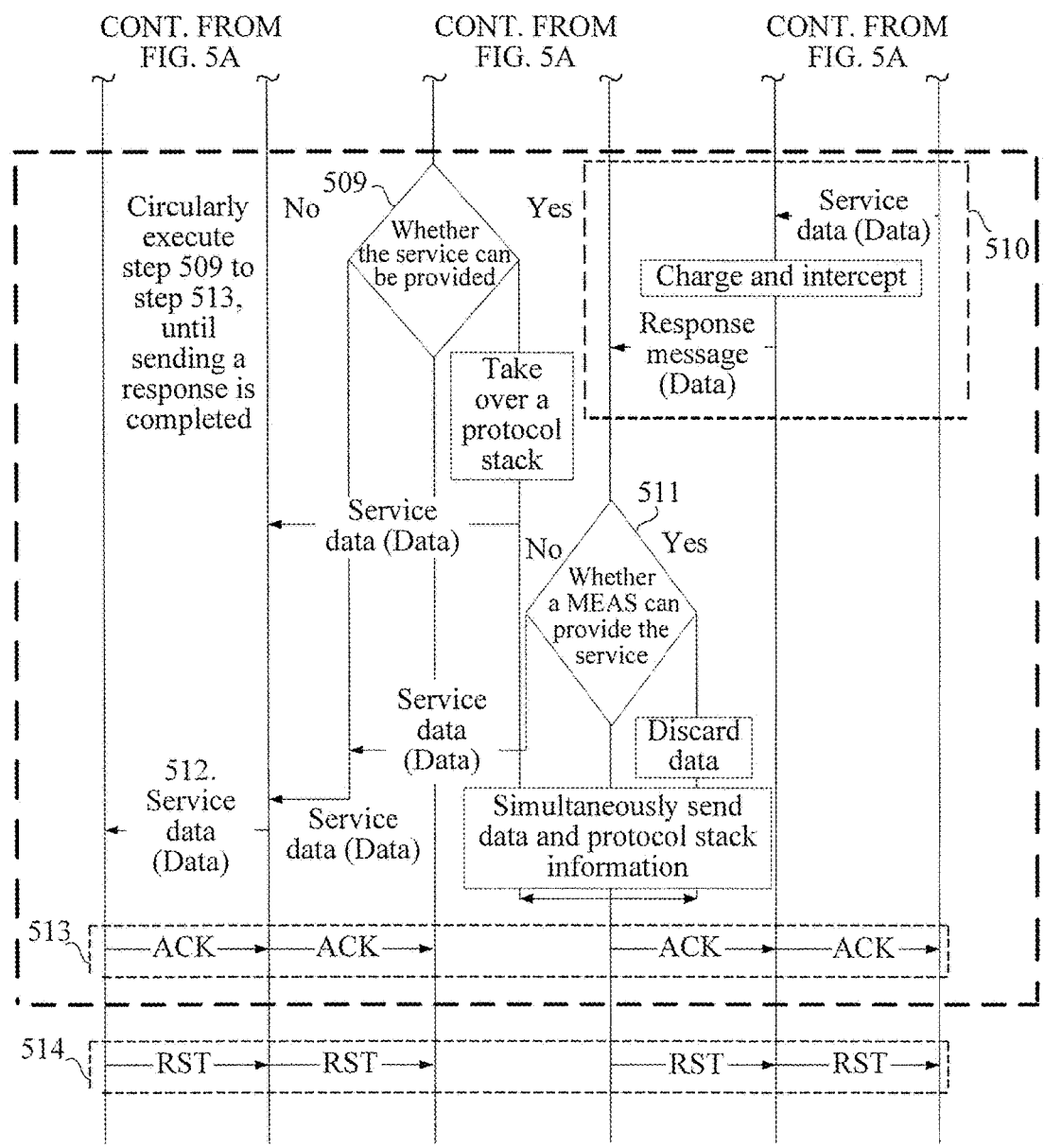

FIG. 5A and FIG. 5B are a signaling diagram of Embodiment 3 of a service provisioning method according to the present invention. In this embodiment, when transmission layer protocol processing is deployed in both an MEAS and an MEAS-SF, the MEAS perceives content and an application service, and needs to perform synchronization on protocol stack states and data relocation for each service request; this embodiment is applicable to a scenario in which multiple eNodeBs correspond to one MEAS and MEAS-SF in a communications network. With reference to FIG. 1, FIG. 5A and FIG. 5B, the following describes the service provisioning method provided in the embodiment of the present invention in detail.

501: A UE sends a first link establishment request to an eNodeB.

The first link establishment request may be a SYN packet for link establishment.

502: After receiving the SYN packet, the eNodeB may use a conventional network or an MEAS network to send the SYN packet according to a flow control principle, and if the conventional network is used, all procedures and processing are the same as those in the conventional network; and transparent service transmission is implemented at the MEAS-SF.

503: If the MEAS network is used, the eNodeB sends the first link establishment request to the MEAS, and the MEAS establishes a protocol stack.

504: The MEAS sends the SYN packet to the MEAS-SF, and then the MEAS-SF sends the SYN packet to the SP.

505: The SP returns a first link establishment response, that is, an SYN ACK, to the UE over a path for receiving the SYN packet, and in this process, the MEAS records protocol stack information transmitted between the SP and the UE.

506: The UE returns an ACK response to the SP over the path for receiving the SYN ACK in 505, and in this process, the MEAS records the protocol stack information transmitted between the SP and the UE.

507: The UE initiates a service request, and sends the service request to the MEAS via the eNodeB; the MEAS determines whether the MEAS can provide the user equipment with service data requested in the service request, if yes, service processing indication information indicating that the MEAS can process the service request is set in the service request, indicating that the MEAS can provide the user equipment with the service data requested in the service request, and if not, service processing indication information indicating that the MEAS cannot process the service request is set in the service request, and then the service processing indication information is carried in the service request and sent to the MEAS-SF.

508: After receiving the service request carrying the service processing indication information, the MEAS-SF parses the service request, and records whether the MEAS can process the service request, that is, records a capability of the MEAS for providing the service requested in the service request. After parsing the service request carrying the service processing indication information and recording whether the MEAS can process the service request, the MEAS-SF deletes the service processing indication information from the service request, and forwards the service request to the SP through the P-GW. In this process, the P-GW performs related operations such as charging, interception, and policy control on the user equipment in an uplink process.

509: The MEAS processes the received service request according to the determining made by the MEAS on the received service request in 507. Specifically, if determining that the MEAS can provide the user equipment with the service data requested in the service request, the MEAS takes over original protocol stack information, and the MEAS locally generates, in response to the service request, the service data requested in the service request; if determining that the MEAS cannot provide the user equipment with the service data requested in the service request, the MEAS waits for a response from the SP.

510: After receiving the service request sent by the MEAS-SF via the P-GW, the SP generates the service data requested in the service request, and sends the service data (data) to the MEAS-SF via the P-GW. In this process, the P-GW performs related operations such as charging, interception, and policy control on the user equipment in a downlink process.

511: The MEAS-SF determines, according to the recorded capability of the MEAS for providing the service requested in the service request, whether the MEAS can provide the user equipment with the service data requested in the service request. If determining that the MEAS can provide the user equipment with the service data requested in the service request, the MEAS-SF discards the service data (Data) sent by the SP, and sends protocol stack synchronization information to the MEAS to initiate a protocol stack information synchronization task, to ensure that the data of the SP can be directly received after eNodeB handover; otherwise, if determining that the MEAS cannot provide the user equipment with the service data requested in the service request, the MEAS-SF sends, to the MEAS, the service data (Data) sent by the SP, that is, sends the received service data (Data) to the MEAS.

512: The MEAS sends, to the UE through the eNodeB, the service data (Data) that is requested in the service request and locally generated in response to the service request or the received service data (Data) that is requested in the service request and generated by the SP, so as to provide the service such as content and an application service for the UE.

513: The UE returns an ACK to the SP, where after the ACK is processed by the protocol stack of the MEAS, and then to a protocol stack of the SP for processing.

It should be noted that, a size of the service data such as content and an application service requested in the service request initiated by the user equipment may be large, and the MEAS or the SP needs to generate service data according to the service request and send the service data to the user equipment for multiple times, that is, multiple pieces of service data may be generated for a same service request. In this case, 509 to 513 are circularly executed, which are specifically shown by black dashed boxes in the figure, until all service data is sent.

514: After the responding to the service requested in the service request initiated by the UE is complete, the UE sends a link removal message, such as a reset command (Reset, RST for short) or a final command (Final, FIN for short) (not shown in the figure) to the SP, to remove the connection which is established between the UE and the SP through the eNodeB, the MEAS, an S-GW, the MEAS-SF, and the P-GW, that is, after receiving the link removal message, the MEAS removes connections between the MeAS and the UE and the eNodeB, and after receiving the link removal message, the SP removes connections between the SP and the MEAS-SF and the P-GW.

Figure 6A:
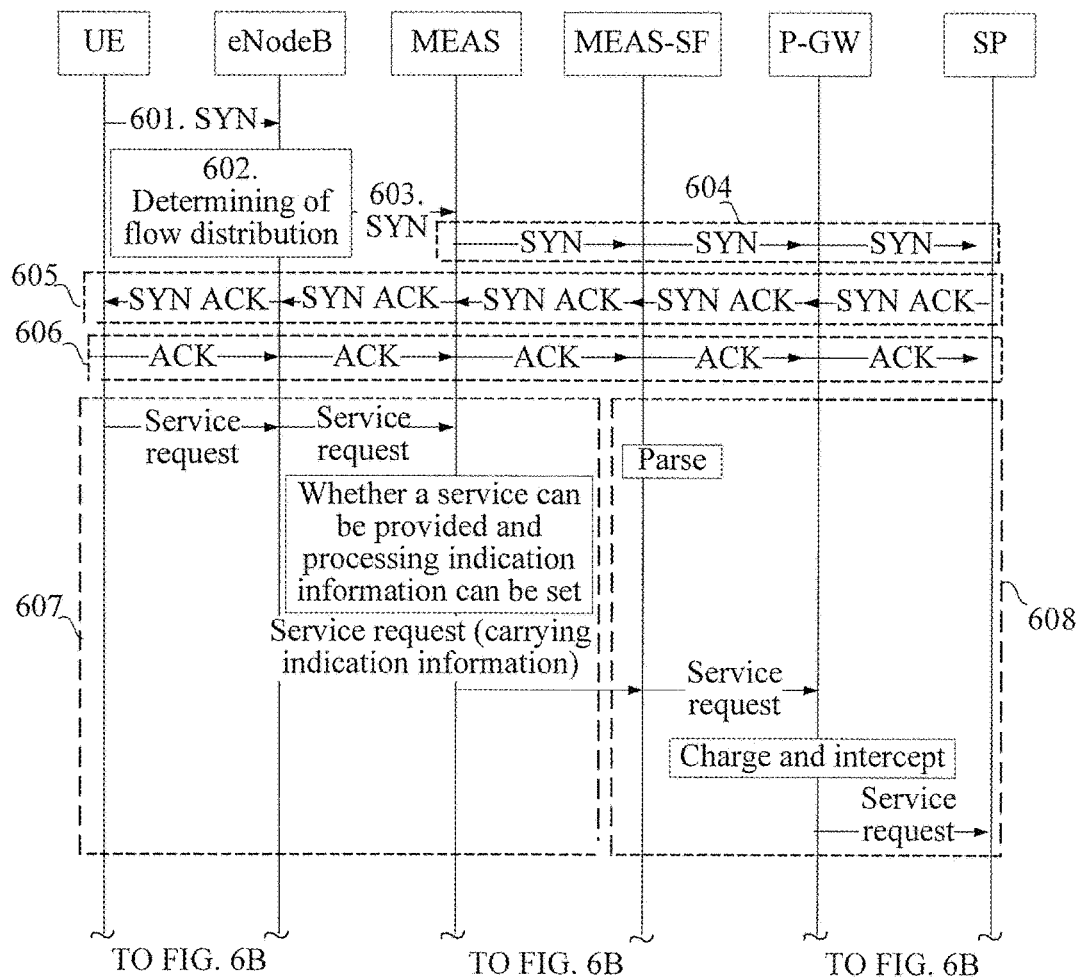
FIG. 6A and FIG. 6B are a signaling diagram of a service provisioning method according to one embodiment of the present invention.
Figure 6B:
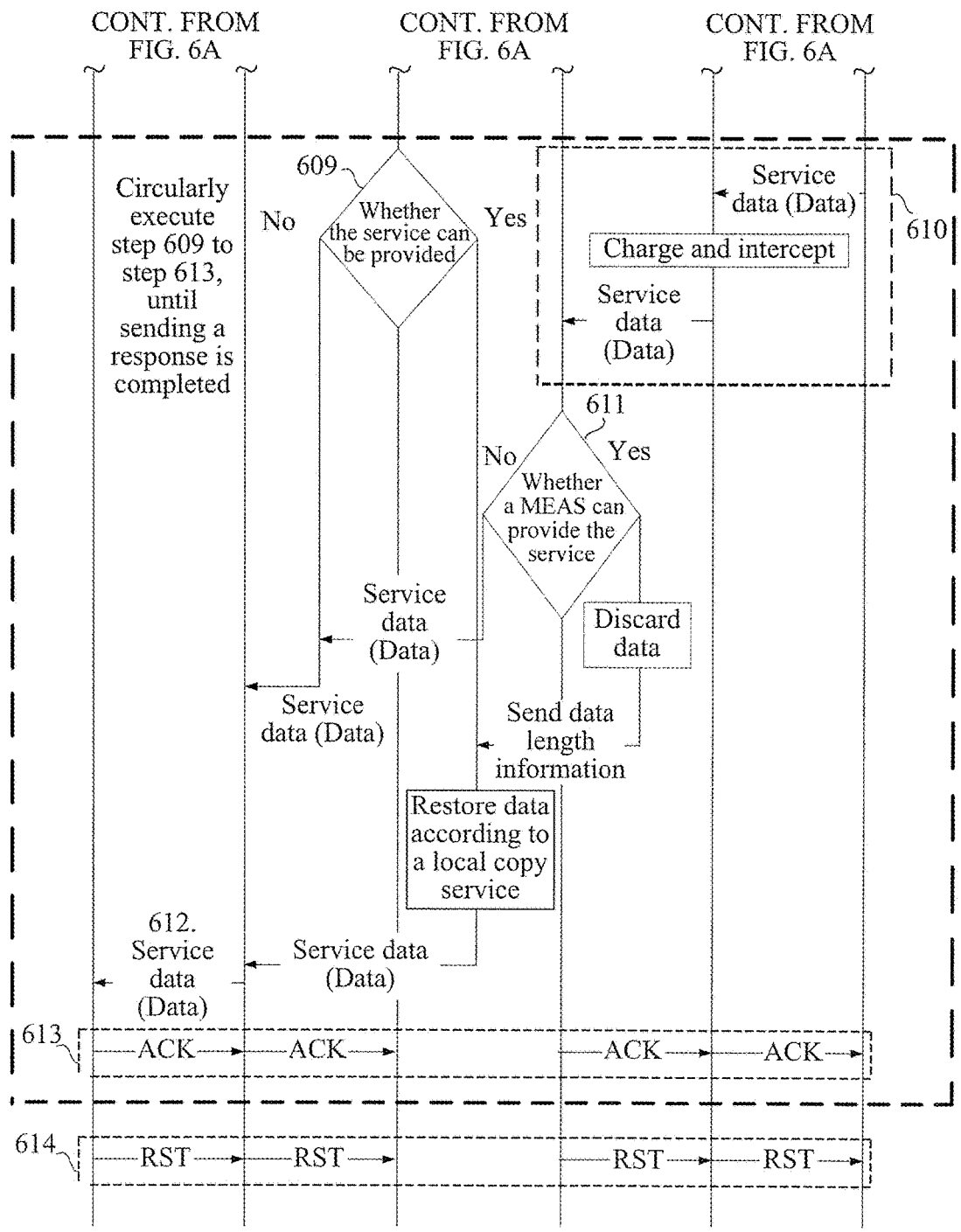

FIG. 6A and FIG. 6B are a signaling diagram of Embodiment 4 of a service provisioning method according to the present invention. A difference between this embodiment and the embodiment shown in FIG. 5A and FIG. 5B lies in that: in the embodiment in FIG. 5A and FIG. 5B, transmission layer protocol processing is deployed in both an MEAS and an MEAS-SF, and the MEAS perceives content or an application service; however, in this embodiment, in the MEAS, transmission layer protocol processing is not deployed, and only data of an application layer is deployed; the MEAS perceives content or an application service, the MEAS and the MEAS-SF perform transmission according to data length and a data offset so as to save a backhaul bandwidth, and a UE and an SP keep connected; with reference to FIG. 1 and FIG. 6A and FIG. 6B, the service provisioning method provided in the embodiment of the present invention is described in detail in the following.

An implementation process of 601 to 608 is the same as that of 501 to 508 in the embodiment in FIG. 5A and FIG. 5B, and for details, refer to the embodiment in FIG. 5A and FIG. 5B, which is not described herein again.

609: The MEAS processes the received service request according to the determining made by the MEAS on the received service request in 607. Specifically, if determining that the MEAS can provide the user equipment with the service data requested in the service request, the MEAS prepares mirrored response content; if determining that the MEAS cannot provide the user equipment with the service data requested in the service request, the MEAS waits for a response from the SP.

610: After receiving the service request sent by the MEAS-SF via the P-GW, the SP generates the service data (Data) requested in the service request, and sends the service data to the MEAS-SF via the P-GW. In this process, the P-GW performs related operations such as charging, interception, and policy control on the user equipment in a downlink process.

611: The MEAS-SF determines, according to the recorded capability of the MEAS for providing the service requested in the service request, whether the MEAS can provide the user equipment with the service data requested in the service request. If determining that the MEAS can provide the user equipment with the service data requested in the service request, the MEAS-SF discards the service data (Data) that is generated in response to the service request and sent by the SP, and sends the data length and offset information to the MEAS according to a transmission protocol, where the data length and offset information determine specific content of a piece of service data; otherwise, if determining that the MEAS cannot provide the user equipment with the service data requested in the service request, the MEAS-SF sends, to the MEAS, the service data (Data) that is generated in response to the service request and sent by the SP, that is, sends the received service data (Data) to the MEAS.

612: The MEAS locally generates, in response to the service request, corresponding service data according to the received data length and offset information sent by the MEAS-SF and the locally deployed services such as content and an application service that are provided by the SP, and then sends the locally generated service data (Data) or the received service data (Data) generated by the SP to the UE through the eNodeB, so as to provide the service such as content and an application service for the UE.

613: The UE returns an ACK to the SP, where after the ACK is processed by the protocol stack of the MEAS and then sent to a protocol stack of the SP for processing.

It should be noted that, a size of the service data such as content and an application service requested in the service request initiated by the user equipment may be large, and the MEAS or the SP needs to generate corresponding service data according to the service request and send the service data to the user equipment for multiple times, that is, multiple pieces of service data may be generated for a same service request. In this case, 609 to 613 are circularly executed, which are specifically shown by black dashed boxes in the figure, until all service data (Data) is sent.

614: After the service data requested in the service request initiated by the UE is sent, the UE sends a link removal message, such as a reset command (Reset, RST for short) or a final command (Final, FIN for short) (not shown in the figure) to the SP, to remove the connection established between the UE and the SP through the eNodeB, the MEAS, an S-GW, the MEAS-SF, and the P-GW, that is, after receiving the link removal message, the MEAS removes connections between the MeAS and the UE and the eNodeB, and after receiving the link removal message, the SP removes connections between the SP and the MEAS-SF and between the SP and the P-GW.

Figure 7A:
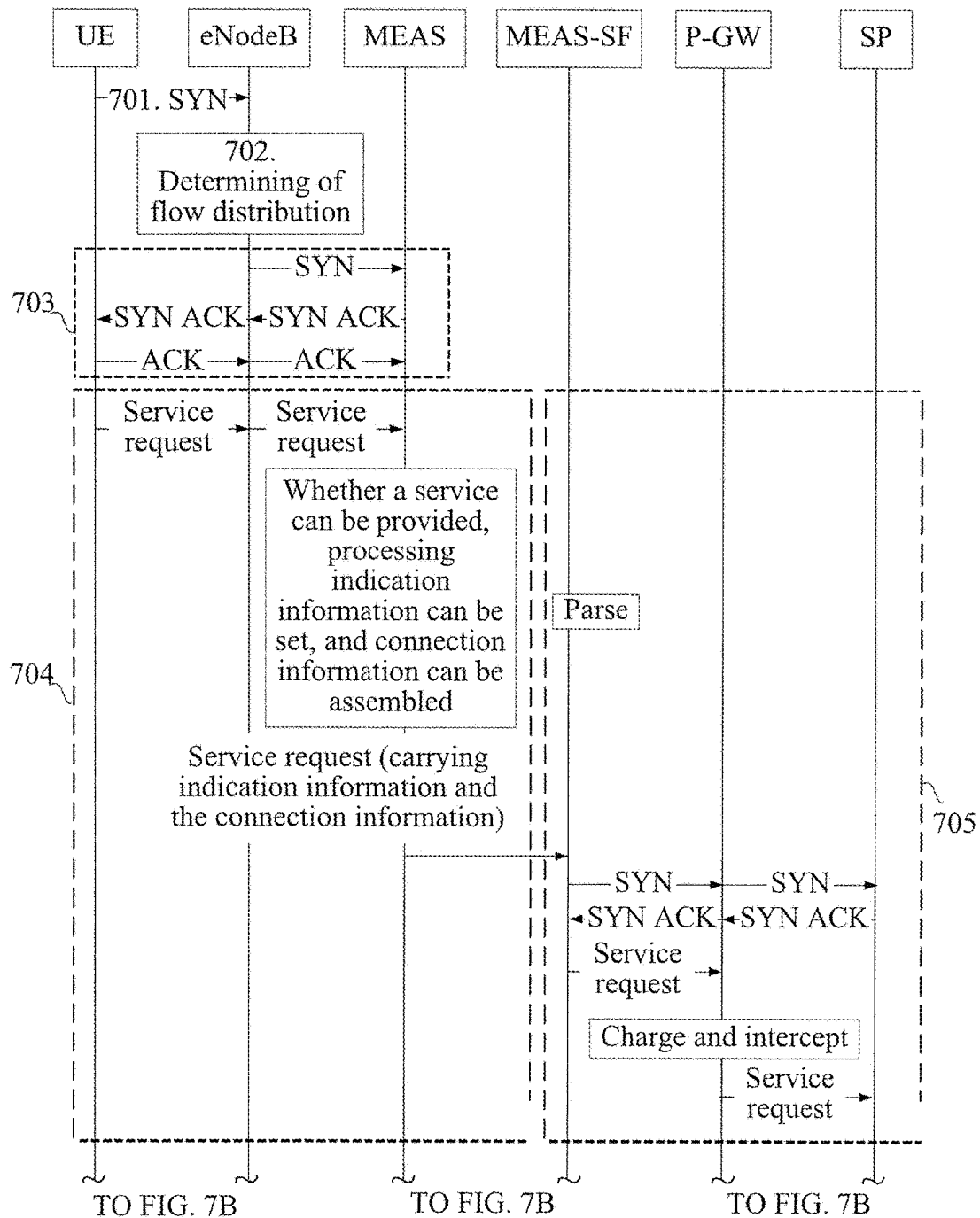
FIG. 7A and FIG. 7B are a signaling diagram of a service provisioning method according to one embodiment of the present invention.
Figure 7B:
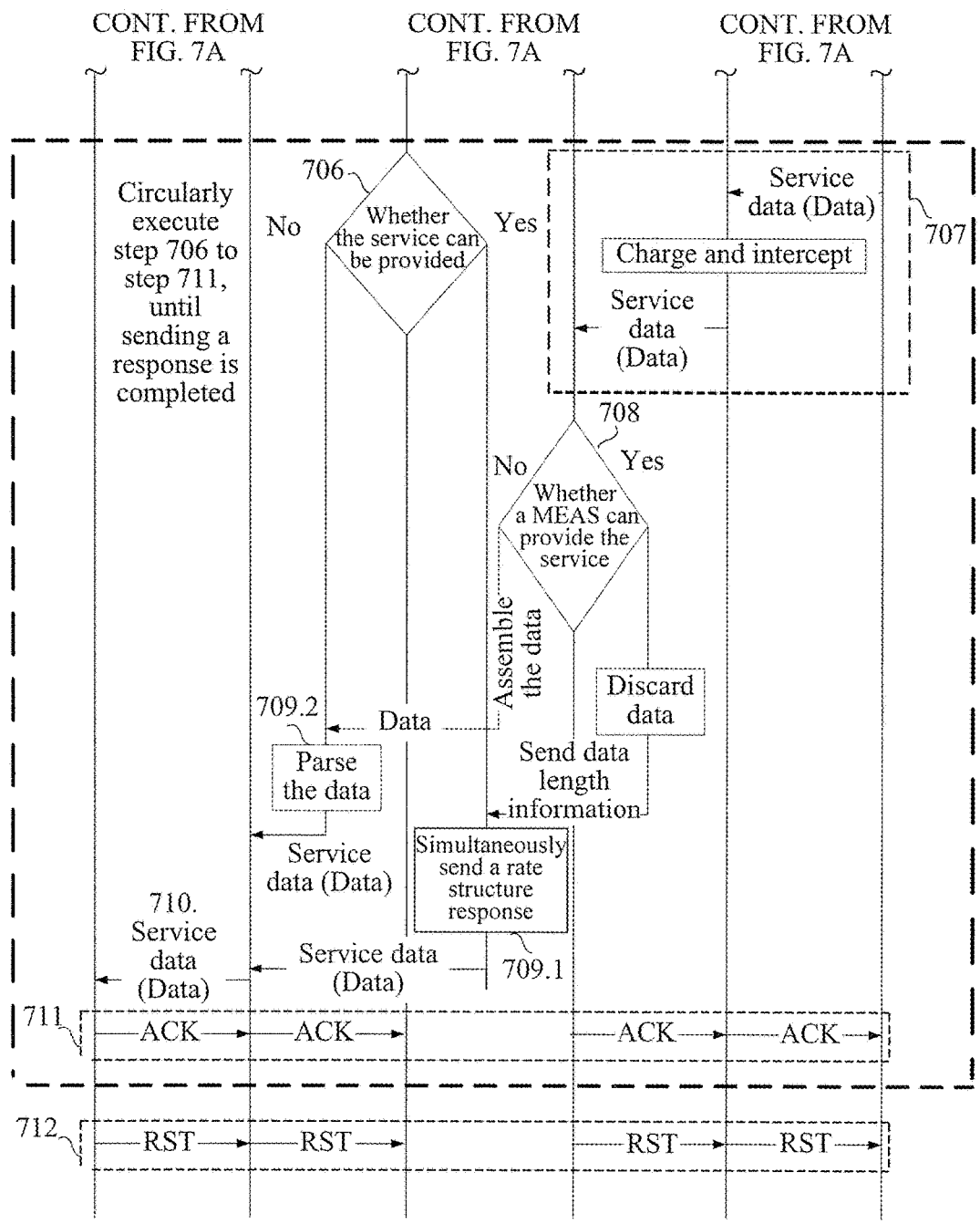

FIG. 7A and FIG. 7B are a signaling diagram of Embodiment 5 of a service provisioning method according to the present invention. In this embodiment, an application service part of a service is deployed at an application layer of the MEAS, and the application layer can independently provide a service for a user equipment; however, a proxy request part of a service is deployed in an MEAS-SF, and the MEAS-SF may simulate the UE to send a response to the SP; this embodiment is applicable to a scenario in which multiple MEASs and MEAS-SFs exist in a communications network. With reference to FIG. 3 and FIG. 7A and FIG. 7B, the following describes the service provisioning method provided in the embodiment of the present invention in detail.

701: A UE sends a second link establishment request to an eNodeB.

The second link establishment request may be a SYN packet for link establishment.

702: After receiving the SYN packet, the eNodeB may use a conventional network or an MEAS network to send the SYN packet according to a flow control principle, and if the conventional network is used, all procedures and processing are the same as those in the conventional network; and transparent service transmission is implemented at the MEAS-SF.

703: If the MEAS network is used, the eNodeB sends the SYN packet to the MEAS, and the MEAS establishes, instead of the SP, a connection to the UE, and returns a second link establishment response to the UE, that is, the MEAS returns an SYN ACK to the UE, and the UE sends an ACK to the MEAS after receiving the SYN ACK, so that the connection between the UE and the MEAS is established.

704: The UE initiates a service request which flows to the MEAS via the eNodeB; the MEAS determines whether the MEAS can provide the user equipment with service data requested in the service request, if yes, service processing indication information indicating that the MEAS can process the service request is set in the service request; otherwise, service processing indication information indicating that the MEAS cannot process the service request is set in the service request, and the service processing indication information and connection information which indicates that the connection is established between the UE and the MEAS are carried by the service request and sent to the MEAS-SF.

705: After receiving the service request carrying the service processing indication information and the connection information which indicates that the connection is established between the UE and the MEAS, the MEAS-SF parses the service request to obtain the service processing indication information and the connection information, and records, according to the service processing indication information obtained by means of parsing, whether the MEAS can provide the user equipment with the service data requested in the service request, that is, records a capability of the MEAS for providing the service requested in the service request; and after finding, according to the connection information obtained by means of parsing, that only the connection between the user equipment and the MEAS is established, the MEAS-SF sends a third link establishment request, such as a SYN packet for link establishment, to the SP through the P-GW, and receives, through the P-GW, a third link establishment response, such as an SYN ACK, to the third link establishment request from the SP, so as to establish a connection between the MEAS-SF and the SP. Then, the MEAS-SF sends the service request to the SP via the P-GW based on the established connection between the MEAS-SF and the SP. In this process, the P-GW performs related operations such as charging, interception, and policy control on the user equipment in an uplink process.

706: The MEAS processes the received service request according to the determining made by the MEAS on the received service request in 704. Specifically, if determining that the MEAS can provide the user equipment with the service data requested in the service request, the MEAS locally generates corresponding service data (Data) in response to the service request; otherwise, if determining that the MEAS cannot provide the user equipment with the service requested in the service request, the MEAS waits for a response from the SP.

707: After receiving the service request sent by the MEAS-SF via the P-GW, the SP generates the service data (Data) corresponding to the service request, and sends the service data to the MEAS-SF via the P-GW. In this process, the P-GW performs related operations such as charging, interception, and policy control on the user equipment in a downlink process.

708: The MEAS-SF determines, according to the recorded capability of the MEAS for providing the service requested in the service request, whether the MEAS can provide the user equipment with the service data requested in the service request. If determining that the MEAS can provide the user equipment with the service requested in the service request, the MEAS-SF discards the service data (Data) that is sent by the SP in response to the service request, and sends rate control information to the MEAS, so that rates between the MEAS and the MEAS-SF are synchronized; otherwise, if the MEAS-SF determines that the MEAS cannot provide the user equipment with the service data requested in the service request, and connections are established between the UE and the MEAS, between the MEAS-SF and the SP, and not between the MEAS and the MEAS-SF by using the link establishment SYN packet, the MEAS-SF needs to encapsulate the service data again, that is, the MEAS-SF re-assembles, through an out-of-band interface, the service data sent by the SP in response to the service request, and forwards the service data to the MEAS.

709: Information received by the MEAS varies according to a service provisioning capability of the MEAS. Specifically, this step may include the following sub-steps.

709.1: If the MEAS receives and parses data description information such as data length and offset information sent by the MEAS-SF, and if rate control information is obtained by means of parsing, the rates are synchronized between the MEAS and the MEAS-SF.

709.2: If the MEAS receives the service data requested in the service request re-assembled by the MEAS-SF, the MEAS obtains corresponding content by means of parsing and sends the content to the user equipment.

710: The UE sends, to the UE through the eNodeB, the locally generated service data and the service data, which is obtained by parsing the service request re-assembled by the MEAS-SF, so as to provide a service such as content and an application service for the UE.

711: The UE returns an ACK to the MEAS, and the MEAS-SF returns an ACK to the SP.

It should be noted that, a size of the service data such as content and an application service requested in the service request initiated by the user equipment may be large, and the MEAS or the SP needs to generate corresponding service data according to the service request and send the service data to the user equipment for several times, that is, multiple pieces of service data may be generated for a same service request. In this case, 706 to 711 are circularly executed, which are specifically shown by black dashed boxes in the figure, until all service data is sent.

712: After the service data requested in the service request initiated by the UE is sent, the UE sends a link removal message, such as a reset command (Reset, RST for short) or a final command (Final, FIN for short) (not shown in the figure) to the SP, to remove a connection established between the UE and the SP through the eNodeB, the MEAS, an S-GW, the MEAS-SF, and the P-GW, that is, after receiving the link removal message, the MEAS removes connections between the MEAS and the UE and the eNodeB, and after receiving the link removal message, the SP removes connections between the SP and the MEAS-SF and between the SP and the P-GW.

In the embodiment in FIG. 7A and FIG. 7B, the connection is initially established between the UE and the MEAS, each eNodeB corresponds to one MEAS or MEAS-SF, and multiple MEASs and MEAS-SFs exist in the communications network; however, in the embodiments in FIG. 5A and FIG. 5B and FIG. 6A and FIG. 6B, the connection is established between the UE and the SP, only one MEAS and MEAS-SF exist in the communications network, and the MEAS can initiate a protocol stack information synchronization task, to ensure that the service can directly receive data from the SP after the eNodeB handover. In the embodiment in FIG. 7A and FIG. 7B, the MEAS is a connection termination point, or may also be called a protocol anchor point; therefore, when the eNodeB handover occurs, an MEAS switchover may be initiated according to a mapping relationship between MEASs in a network construction rule, and then, the eNodeB handover occurs. For details, reference may be made to FIG. 8A and FIG. 8B.

Figure 8A:
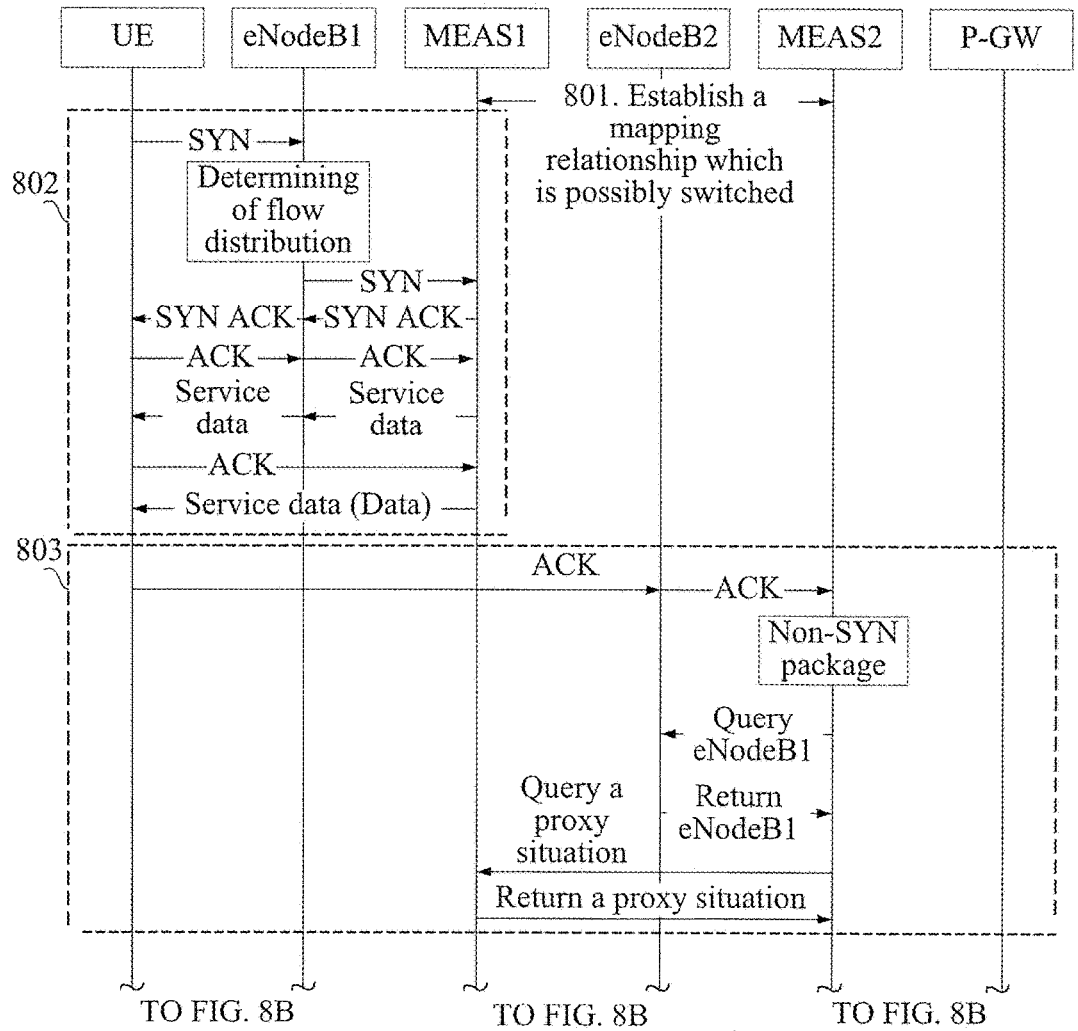
FIG. 8A and FIG. 8B are a signaling diagram of a service provisioning method according to one embodiment of the present invention.
Figure 8B:
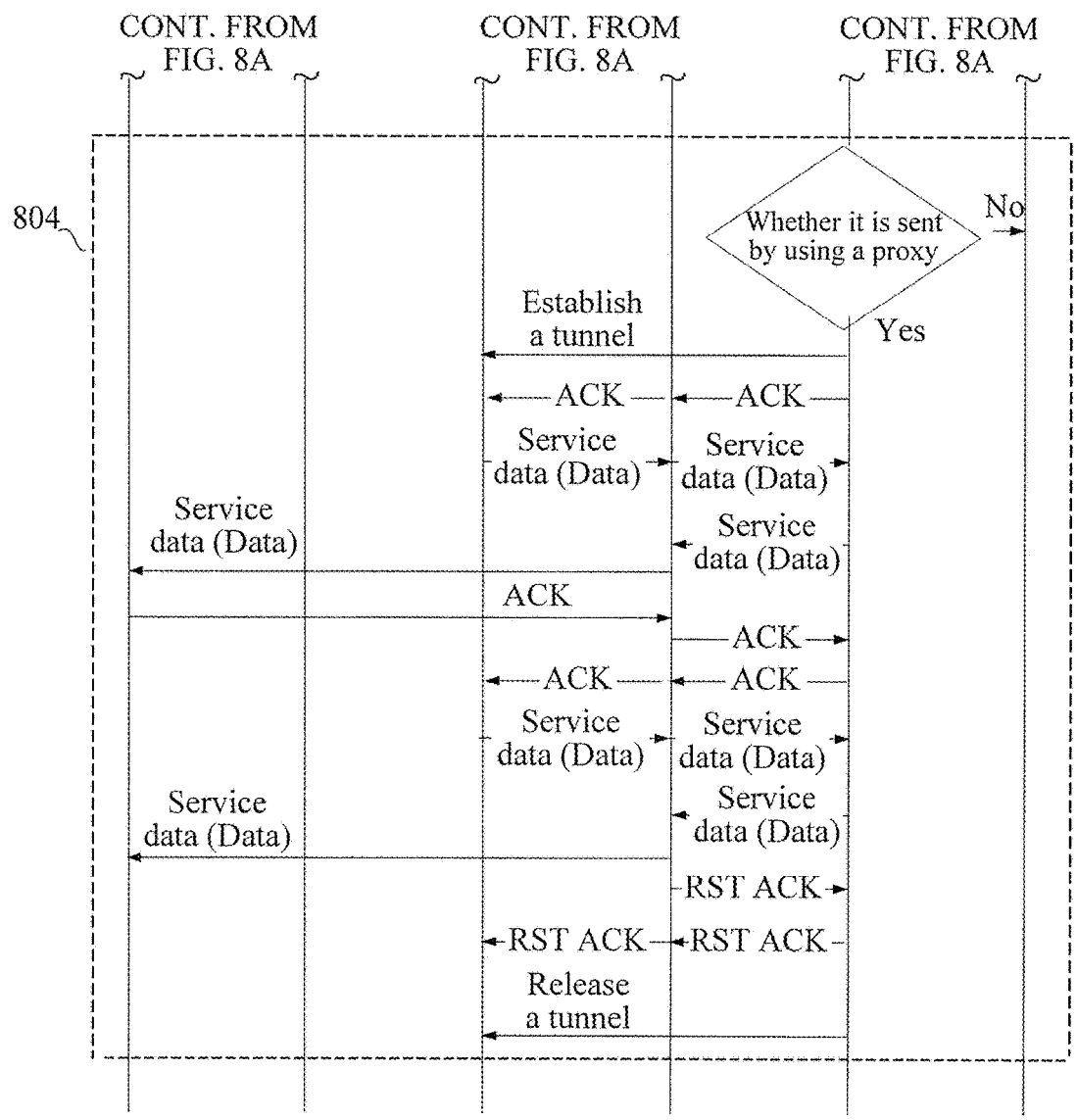

FIG. 8A and FIG. BE are a signaling diagram of Embodiment 6 of a service provisioning method according to the present invention. This embodiment is applicable to a scenario in which multiple MEASs and MEAS-SFs exist in a communications network and an eNodeB handover occurs. With reference to FIG. 3 and FIG. 8A and FIG. 8B, the following describes the service provisioning method provided in the embodiment of the present invention in detail.

801: Establish a mapping relationship of MEASs according to a mobile network construction rule. Specifically, in this step, a mapping relationship between an MEAS1 and an MEAS2 is established.

802: A UE accesses a mobile communications network via an eNodeB1, and performs a three-way handshake with the MEAS1, for example, an SYN, an SYN ACK, and an ACK are sent between the UE and the MEAS, a connection between the UE and the MEAS1 is established, and the MEAS1 provides a service for the UE, that is, the MEAS1 directly sends, to the UE, corresponding service data (Data) generated in response to the service request.

803: When the UE is handed over from the eNodeB1 to an eNodeB2, the UE sends an ACK response to the MEAS2, and the MEAS2 queries the source eNodeB1 and the MEAS1 for a proxy situation of the service request. Specifically, if a received service request is an SYN packet, it indicates that a service is not a historical service, and the MEAS2 directly determines whether the MEAS2 can provide the user equipment with the service requested in the service request; otherwise, if the received service request is not an SYN packet, the MEAS1 determines whether the MEAS1 can provide the user equipment with the service requested in the service request, and if the MEAS1 cannot provide the user equipment with the service requested in the service request, the MEAS1 sends the service request to the SP by using a conventional network.

804: If the MEAS2 finds from the source eNodeB1 and the MEAS1 that the service request is sent by using a proxy, a new tunnel is established, and the corresponding service data (Data) generated by the MEAS1 in response to the request is forwarded to the MEAS2 through the eNodeB2 over the tunnel, then the MEAS2 sends the service data to the P-GW so that the P-GW performs charging, interception and the like (not shown in the figure), and then the service data is sent to the user equipment via the eNodeB2; data forwarding is performed continuously and circularly until all connections are disconnected; if the MEAS2 finds from the eNodeB1 and the MEAS1 that the service request is not sent by using a proxy, the MEAS2 sends the service request to the SP.

It should be noted that, based on the prior art, only the MEAS and the MEAS-SF are added in the schematic architectural diagrams of the service provisioning systems shown in FIG. 1 and FIG. 2; however, the present invention is not limited thereto; in other possible implementation manners, a mobile edge application server center (MEAS center) may further be added, the MEAS Center manages various MEASs, and the MEAS Center and the MEAS process services in a hierarchical manner.

It should be further noted that, in the foregoing embodiments of the present invention, the MEAS is close to the eNodeB in physical deployment; however, the present invention is not limited thereto; in other possible implementation manners, the MEAS may also be integrated in a base station, such as an eNodeB. Using a UMTS network as an example, when the MEAS is deployed close to a NodeB or is integrated in a NodeB, bandwidth resources in a RAN, that is, between the NodeB and a radio network controller (Radio Network Controller, RNC for short below), may be saved.

Figure 9:
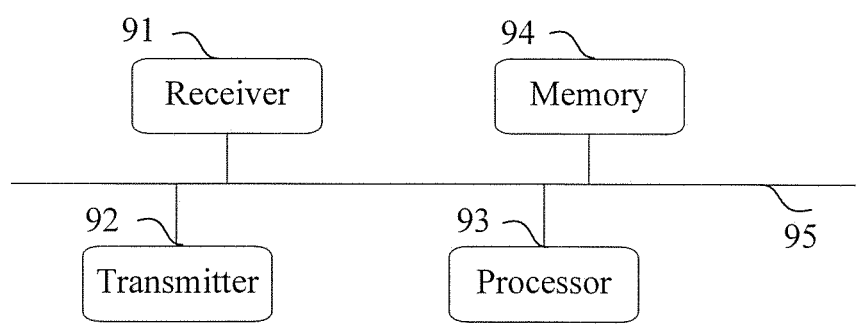
FIG. 9 is a schematic structural diagram of a mobile edge application server MEAS according to one embodiment of the present invention.

FIG. 9 is a schematic structural diagram of Embodiment 1 of a mobile edge application server MEAS according to the present invention. The MEAS in this embodiment is deployed at an access network side, connected to one or more base stations, and further connected to a mobile edge application server support function MEAS-SF; specifically, the MEAS can implement each steps of the method that is applied to the MEAS and provided in any embodiment of the present invention, and a specific implementation process is not described herein again. The MEAS provided in this embodiment may specifically include: a receiver 91, a transmitter 92, a processor 93, a memory 94, and at least one communication bus 95. The processor 93 may be a central processing unit (CPU for short), and the communication bus 95 is configured to implement connection and communication between the apparatuses. The memory 94 may include a high-speed RAM memory, and may also further include a non-volatile memory, for example, at least one disk memory.

The memory 94 may optionally include at least one storage apparatus which is located far away from the foregoing processor 93.

The receiver 91 is configured to receive, through a connected base station, a service request sent by a user equipment, and send the service request to the MEAS-SF, where the service request indicates that the user equipment requests a service from a service provider SP.

The processor 93 is configured to determine whether the MEAS can provide the user equipment with the service data requested in the service request.

The transmitter 92 is configured to: if the processor determines that the MEAS can provide the user equipment with the service data requested in the service request, send, to the user equipment through the connected base station, the service data requested in the service request.

According to the mobile edge application server MEAS provided in this embodiment, services such as content and an application service that are provided by the SP are deployed in the MEAS, and when the MEAS can provide the user equipment with the service requested in the service request, the MEAS directly and locally generates service data in response to the service request; because the MEAS is generally close to an eNodeB in physical deployment, that is, deployed at a RAN side, the user equipment directly obtains required service data from the RAN side instead of obtaining, from a server or the Internet through a RAN and a CN, the service data provided by the SP, which avoids data congestion between the RAN and the CN and saves network resources.

Further, the receiver 91 is further configured to: if the processor determines that the MEAS cannot provide the user equipment with the service data requested in the service request, obtain, from the MEAS-SF, the service data requested in the service request and sent by the SP.

Further, the transmitter 92 is further configured to send, to the user equipment through the connected base station, the service data requested in the service request and sent by the SP.

Further, the service request sent by the transmitter 92 to the MEAS-SF further carries service processing indication information, and the service processing indication information is used for indicating whether the MEAS can provide the user equipment with the service data requested in the service request.

Further, the receiver 91 is further configured to: before receiving, through the connected base station, the service request sent by the user equipment, receive, through the connected base station, a first link establishment request sent by the user equipment, where the first link establishment request is used for requesting establishment of a connection between the user equipment and the SP.

The transmitter 92 is further configured to send the first link establishment request to the MEAS-SF.

The receiver 91 is further configured to receive a first link establishment response to the first link establishment request from the SP, where the first link establishment response is sent by the MEAS-SF.

The transmitter 92 is further configured to send, to the user equipment through the connected base station, the first link establishment response to the first link establishment request.

Further, the receiver 91 is further configured to: before receiving, through the connected base station, the service request sent by the user equipment, receive, through the connected base station, a second link establishment request sent by the base station, where the second link establishment request is used for requesting establishment of the connection between the user equipment and the SP.

The transmitter 92 is further configured to send, to the user equipment through the connected base station, a second link establishment response to the second link establishment request, add information about a connection between the MEAS and the user equipment in the service request and send the information about the connection to the MEAS-SF.

Figure 10:
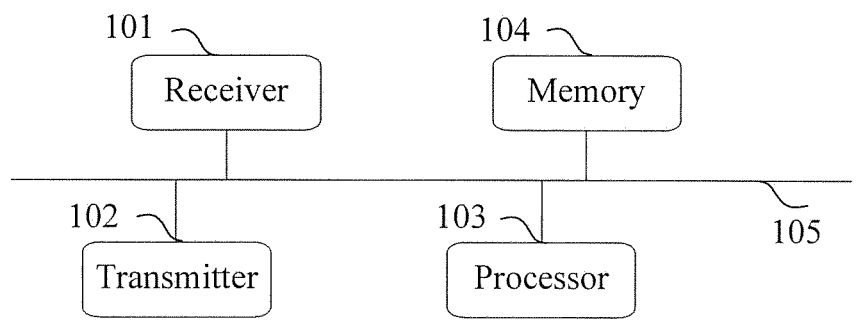
FIG. 10 is a schematic structural diagram of a mobile edge application server support function MEAS-SF according to one embodiment of the present invention.

FIG. 10 is a schematic structural diagram of Embodiment 1 of a mobile edge application server support function MEAS-SF according to the present invention. The MEAS-SF in this embodiment is connected to one or more mobile edge application servers MEASs and connected to a packet data network gateway P-GW; specifically, the MEAS-SF can implement each step of the method that is applied to the MEAS-SF and provided in any embodiment of the present invention, and a specific implementation process is not described herein again. The MEAS-SF provided in this embodiment may specifically include: a receiver 101, a transmitter 102, a processor 103, a memory 104, and at least one communication bus 105. The processor 103 may be a central processing unit (CPU for short), and the communication bus 105 is configured to implement connection and communication between the apparatuses. The memory 104 may include a high-speed RAM memory, and may also further include a non-volatile memory, for example, at least one disk memory. The memory 104 may optionally include at least one storage apparatus which is located far away from the foregoing processor 103.

The receiver 101 is configured to receive a service request sent by the MEAS;

The transmitter 102 is configured to send the service request to an SP through the P-GW.

The receiver is further configured to receive, through the P-GW, service data requested in the service request and sent by the SP, so that a core network side charges for the service request and the service data requested in the service request.

According to the mobile edge application server MEAS-SF provided in this embodiment, services such as content and an application service that are provided by the SP are deployed in the MEAS, and when determining that the MEAS can provide the user equipment with the service requested in the service request, the MEAS discards the service data that is generated by the SP in response to the service request, and directly and locally generates corresponding service data in response to the service request; because the MEAS is generally close to an eNodeB in physical deployment, that is, deployed at a RAN side, the user equipment directly obtains required service data from the RAN side instead of obtaining, from a server or the Internet through a RAN and a CN, the service data provided by the SP, which avoids data congestion between the RAN and the CN and saves network resources.

Further, the service request received by the receiver 101 further carries service processing indication information, and the service processing indication information is used for indicating whether the MEAS can provide the user equipment with the service data requested in the service request.

Further, the processor 103 is further configured to: after the receiver 101 receives, through the P-GW, the service data requested in the service request and sent by the SP, determine whether the MEAS can provide the user equipment with the service data requested in the service request, and if yes, discard the service data requested in the service request and sent by the SP.

Further, the transmitter 102 is further configured to: if the processor determines that the MEAS cannot provide the user equipment with the service data requested in the service request, send, to the MEAS, the service data requested in the service request and sent by the SP.

Further, the receiver 103 is further configured to receive a first link establishment request sent by the MEAS, where the first link establishment request is used for requesting establishment of a connection between the user equipment and the SP.

The transmitter 102 is further configured to send the first link establishment request to the SP through the P-GW.

The receiver 101 is further configured to receive, through the P-GW, a first link establishment response to the first link establishment request from the SP.

The transmitter 102 is further configured to send the first response to the MEAS.

Further, the service request received by the receiver 101 further carries connection information, and the connection information is used for indicating that the connection is established between the MEAS and the user equipment.

The transmitter 102 is further configured to send a third link establishment request to the SP through the P-GW according to the connection information.

The receiver 101 is further configured to receive, through the P-GW, a third link establishment response to the third link establishment request from the SP.

Further, if the processor 103 determines that the MEAS can provide the user equipment with the service data requested in the service request, the processor 103 is further configured to synchronize, with the MEAS, information of the service data requested in the service request; or is further configured to synchronize, with the MEAS, protocol stack information between the user equipment and the SP.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, a persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A service provisioning system, comprising:
at least one first apparatus deployed at an access network side;
at least one second apparatus deployed at a core network side and connected to the at least one first apparatus;
the first apparatus is configured to:
receive a service request from a user equipment, wherein the service request indicates that the user equipment requests service data from a service provider (SP), and determine whether the first apparatus can provide the user equipment with the service data requested in the service request,
if the first apparatus can provide the user equipment with the service data requested in the service request, send the service request to the second apparatus and send the service data requested in the service request to the user equipment, and if the first apparatus cannot provide the user equipment with the service data requested in the service request, send the service request to the second apparatus, obtain, from the second apparatus, the service data requested in the service request and sent by the SP, and send to the user equipment the service data requested in the service request and sent by the SP; and the second apparatus is configured to:

receive the service request from the first apparatus, send the service request to the SP through a core network device, and receive the service data requested in the service request and sent by the SP, wherein one or more modules for performing charging, interception, or policy control on the user equipment are connected to or integrated in the core network device;

wherein the second apparatus is further configured to:

if the first apparatus can provide the user equipment with the service data requested in the service request, discard the service data requested in the service request and sent by the SP, and if the first apparatus cannot provide the user equipment with the service data requested in the service request, send, to the first apparatus, the service data requested in the service request and sent by SP.

2. The service provisioning system according to claim 1, wherein the core network device comprises a packet data network gateway (P-GW) configured to perform charging, interception, or policy control for the service request.

3. The service provisioning system according to claim 1, wherein if the first apparatus can provide the user equipment with the service data requested in the service request, the second apparatus is configured to receive the service data requested in the service request and sent by the SP through the core network device.

4. The service provisioning system according to claim 3, wherein the core network device comprises a packet data network gateway (P-GW) configured to perform charging, interception, or policy control for the service data requested in the service request and sent by the SP.

5. The service provisioning system according to claim 1, wherein the service request sent from the first apparatus to the second apparatus further carries service processing indication information used for indicating whether the first apparatus can provide the user equipment with the service data requested in the service request.

6. The service provisioning system according to claim 1, wherein the first apparatus comprises a server deployed at a base station.

7. The service provisioning system according to claim 1, wherein:

the first apparatus is connected to one or more base stations and further configured to:

before receiving the service request from the user equipment, receive a first link establishment request from the user equipment, wherein the first link establishment request is used for requesting establishment of a connection between the user equipment and the SP, send the first link establishment request to the second apparatus, and receive a first link establishment response to the first link establishment request from the SP, wherein the first link establishment response is sent by the second apparatus, and send, to the user equipment the first link establishment response to the first link establishment request; and the second apparatus is further configured to:

receive the first link establishment request from the first apparatus, and send the first link establishment request to the SP; and receive the first link establishment response to the first link establishment request from the SP, and send the first link establishment response to the first apparatus.

8. The service provisioning system according to claim 1, wherein:

the first apparatus is connected to one or more base stations and further configured to:

before receiving the service request from the user equipment, receive a second link establishment request from the user equipment, wherein the second link establishment request is used for requesting establishment of a connection between the user equipment and the SP, and send, to the user equipment a second link establishment response to the second link establishment request, wherein the service request sent by the first apparatus to the second apparatus further carries information about a connection between the first apparatus and the user equipment; and the second apparatus is further configured to:

receive the service request that is sent by the first apparatus and carries the information about the connection between the first apparatus and the user equipment, send a third link establishment request to the SP according to the information about the connection, and receive a third link establishment response to the third link establishment request from the SP.

9. The service provisioning system according to claim 1, wherein if the first apparatus can provide the user equipment with the service data requested in the service request, the second apparatus is further configured to:

synchronize, with the first apparatus, information of the service data requested in the service request; or synchronize, with the first apparatus, protocol stack information between the user equipment and the SP.

10. An apparatus deployed at an access network side and connected to a mobile edge application server support function (MEAS-SF), the apparatus comprising:

a receiver, configured to receive a service request from a user equipment, wherein the service request indicates that the user equipment requests service data from a service provider (SP);

a processor, configured to determine whether the apparatus can provide the user equipment with the service data requested in the service request;

a transmitter, configured to:

if the processor determines that the apparatus can provide the user equipment with the service data requested in the service request, send, to the MEAS-SF, the service request, and send, to the user equipment the service data requested in the service request, and if the apparatus cannot provide the user equipment with the service data requested in the service request, send the service request to the MEAS-SF;

wherein the receiver is further configured to obtain, from the MEAS-SF, the service data requested in the service request and sent by the SP, and the transmitter is configured to send to the user equipment the service data requested in the service request and sent by the SP;

wherein the service request sent from the apparatus to the MEAS-SF is sent to the SP through a core network device performing charging, interception, or policy control on the user equipment;

wherein the apparatus is connected to one or more base stations;

wherein the receiver is further configured to, before receiving the service request from the user equipment, receive a first link establishment request from the user equipment, wherein the first link establishment request is used for requesting establishment of a connection between the user equipment and the SP;

wherein the transmitter is further configured to send the first link establishment request to the MEAS-SF;

wherein the receiver is further configured to receive a first link establishment response to the first link establishment request from the SP, wherein the first link establishment response is sent by the MEAS-SF; and wherein the transmitter is further configured to send, to the user equipment, the first link establishment response to the first link establishment request.

11. The apparatus according to claim 10, wherein the service request sent by the transmitter to the MEAS-SF further carries service processing indication information used for indicating whether the apparatus can provide the user equipment with the service data requested in the service request.

12. The apparatus according to claim 10, wherein the apparatus comprises a server deployed at a base station.

13. The apparatus according to claim 10, wherein:

the first apparatus is connected to one or more base stations;

the receiver is further configured to: before receiving the service request from the user equipment, receive a second link establishment request sent by the base station, wherein the second link establishment request is used for requesting establishment of a connection between the user equipment and the SP; and the transmitter is further configured to send, to the user equipment a second link establishment response to the second link establishment request, wherein the service request sent to the MEAS-SF comprises information about a connection between the apparatus and the user equipment.

* * * * *